US008708833B2

(12) United States Patent
Ueda

(10) Patent No.: US 8,708,833 B2
(45) Date of Patent: Apr. 29, 2014

(54) METHOD FOR MEASURING BEHAVIOR OF GOLF CLUB AND BALL

(75) Inventor: Masahiko Ueda, Kobe (JP)

(73) Assignees: SRI Sports Limited, Kobe (JP); Sumitomo Rubber Industries, Ltd., Kobe (JP)

( * ) Notice: Subject to any disclaimer, the term of this patent is extended or adjusted under 35 U.S.C. 154(b) by 168 days.

(21) Appl. No.: 13/399,634

(22) Filed: Feb. 17, 2012

(65) Prior Publication Data

US 2012/0214606 A1 Aug. 23, 2012

(30) Foreign Application Priority Data

Feb. 18, 2011 (JP) .................................. 2011-033169
Feb. 18, 2011 (JP) .................................. 2011-033561

(51) Int. Cl.
*A63F 13/00* (2006.01)

(52) U.S. Cl.
USPC ............ 473/199; 473/151; 473/198; 473/221; 473/222

(58) Field of Classification Search
USPC ............................ 473/151, 198, 199, 221, 222
See application file for complete search history.

(56) References Cited

U.S. PATENT DOCUMENTS

| | | | |
|---|---|---|---|
| 5,471,383 A | 11/1995 | Gobush et al. | |
| 8,328,653 B2 * | 12/2012 | Lock | 473/199 |
| 2001/0023209 A1 | 9/2001 | Yamamoto | |
| 2001/0029207 A1 * | 10/2001 | Cameron et al. | 473/151 |
| 2002/0064764 A1 * | 5/2002 | Fishman et al. | 434/252 |
| 2002/0098898 A1 * | 7/2002 | Manwaring | 473/151 |
| 2003/0228070 A1 | 12/2003 | Miki et al. | |
| 2004/0076311 A1 | 4/2004 | Miki et al. | |
| 2005/0114073 A1 * | 5/2005 | Gobush | 702/143 |
| 2005/0233816 A1 | 10/2005 | Nishino et al. | |
| 2010/0151957 A1 * | 6/2010 | Hohla et al. | 473/221 |

FOREIGN PATENT DOCUMENTS

| | | |
|---|---|---|
| JP | 2826697 B2 | 11/1998 |
| JP | 2950450 B2 | 9/1999 |
| JP | 2001-264016 A | 9/2001 |
| JP | 2005-291824 A | 10/2005 |
| JP | 2007-167549 A | 7/2007 |
| JP | 4109075 B2 | 6/2008 |
| JP | 4109076 B2 | 6/2008 |
| JP | 4307511 B1 | 8/2009 |

* cited by examiner

*Primary Examiner* — James S McClellan
(74) *Attorney, Agent, or Firm* — Birch, Stewart, Kolasch & Birch, LLP

(57) ABSTRACT

A method for measuring behavior of a head of a golf club and of a ball includes obtaining two-dimensional data of three or more marks on a face surface at two points in time before impact; identifying three-dimensional positions of the marks on the two points in time from the two-dimensional data; identifying behavior of the face surface of the three-dimensional position of each mark at the two points in time; identifying time of a contact of the face surface with the ball; estimating behavior of the head at the time of contact of the face surface with the ball; obtaining two-dimensional data of the ball at the two points in time; identifying three-dimensional position and posture of the ball at the two points in time; and estimating a behavior value of the ball from the three-dimensional position and posture of the ball.

25 Claims, 21 Drawing Sheets

METHOD FOR MEASURING BEHAVIOR OF GOLF CLUB AND BALL

This application involves a claim for benefits based on Japanese Patent Application No. 2011-33169 filed on Feb. 18, 2011 and Japanese Patent Application No. 2011-33561 filed on Feb. 18, 2011, which are incorporated herein in their entirety by reference.

BACKGROUND OF THE INVENTION

1. Field of the Invention

The present invention relates to a method for measuring behavior of a golf club to be swung by a golf player and that of a hit ball, and a system thereof.

2. Description of the Related Art

Measurement of behavior of a golf club and behavior of a golf ball is useful in confirmation and improvement of swings, fitting of a golf club which is fit for a golf player, designing and development of a golf club and a golf ball (hereinafter simply referred to as a ball) and the like. Thus, such a measurement system has been used in a golf practice range, a store, a manufacturer, and the like. Prior-art documents disclose various systems for measuring behavior of a golf club or behavior of a ball.

In Japanese Patent No. 2950450 (U.S. Pat. No. 5,471,383), as a measurement system for behavior of a ball, two cameras photograph balls immediately after being hit. Position information obtained through photographing is converted into three-dimensional coordinates to measure behavior of a ball. Japanese Patent Application Publication No. 2001-264016 (US2001/0023209) discloses a system for measuring motions of a ball by configuring a moving ball as images on a one-image frame. Japanese Patent No. 4109075 (US 2004/0076311) discloses a measurement method for identifying a position and a posture of a ball by displacing a position and a posture of an imaginary sphere in such a way that information of imaginary coordinates and the position and posture information of the photographed ball are coincident with each other. Japanese Patent Application Publication No. 2005-291824 (US2005/0233816) obtains first image information and second image information of a ball at different times. A method for measuring behavior of a ball in which the first image information and the second image information are mapped to the surface of a virtual spherical body, and behavior of the ball is measured from correlation of the two pieces of image information is disclosed.

An apparatus and a method for analyzing behavior of a golf club are disclosed in, for example, Japanese Patent No. 2826697, Japanese Patent No. 2950450, Japanese Patent No. 4109076 (US 2003/0228070), Japanese Patent No. 4307511, Japanese Patent Application Publication No. 2007-167549 and the like.

Japanese Patent No. 2826697 discloses an apparatus for measuring motions of a club head. The apparatus multiply images marks provided on at least three parts on a face surface of a club head from mutually different directions, extracting the marks from multiple imaged images, and obtaining three-dimensional coordinates of the above-mentioned marks from two-dimensional coordinates of the extracted marks.

Japanese Patent No. 2950450 discloses a monitor system for measuring flight characteristics of a moving object and an apparatus constituting the system. The system includes at least two cameras capable of photographing three or more target parts attached to a moving object which flies, and image digitalizing means for determining a pathway, velocity, and rotation in initial part of flight of the moving object in response to analog signals from the photographed target parts.

Japanese Patent No. 4109076 discloses a method and an apparatus for measuring an amount of rotation and a direction of a rotation axis of a curved solid. The measuring method obtains multiple two-dimensional images by photographing a rotating curved solid to which multiple marks are attached, at several points in time with a predetermined interval of time. On the one hand, a computer creates an imaginary curved solid on a surface of which multiple marks are attached similarly to the rotating curved solid mentioned above, in a space of three-dimensional coordinates. The computer displaces a posture of the imaginary curved solid so that the marks on the two-dimensional image surface match the marks on the imaginary curved solid surface. The amount of rotation and the direction of the rotation axis of the curved solid are determined by calculating a rotating matrix associated with a rotation operation of the imaginary curved solid during displacement, on the basis of the amount of displacement.

Japanese Patent No. 4307511 discloses a behavior measurement method and a behavior measurement apparatus of a moving object. In the measurement method, multiple marks provided on a moving object are multiply photographed from at least two different directions continuously at several points in time with a certain interval of time. A three-dimensional shape model of the moving object is created. Points (corresponding points) on the three-dimensional shape model corresponding to the photographed marks are identified. Time series data of positions and orientations of the three-dimensional shape model is calculated from the corresponding points on the three-dimensional shape model.

Japanese Patent Application Publication No. 2007-167549 discloses a method for analyzing behavior of a club head. In the analysis method, strobes are flashed with the timing depending on a swing rate of a golf club, the club head is multiply photographed by at least two cameras from mutually different directions, and behavior of the club head is determined from the multiple pieces of image information.

The measurement systems disclosed in Japanese Patent No. 2950450, Japanese Patent Application Publication No. 2001-264016, Japanese Patent No. 4109075, and Japanese Patent Application Publication No. 2005-291824 do not measure behavior of a golf club although they measure behavior of a ball. The systems do not figure out the behavior of the ball and the behavior of the golf club corresponding to the ball.

Although the apparatus disclosed in the above-mentioned Japanese Patent No. 282697 measures behavior of a club head before a ball is hit (impact), it neither measures nor calculates a positional relationship of the club head and the ball. Therefore, a hit point of the ball at the club head cannot be estimated.

The above-mentioned Japanese Patent No. 2950405 explains the DLT method that obtains three-dimensional data from multiple pieces of two-dimensional data of a golf ball as a moving object. Although the system disclosed in this publication can obtain a trajectory, velocity, and rotation in initial part of flight of a golf ball, it cannot obtain a positional relationship of the club head and the ball. Therefore, a hit point of the ball at the club head cannot be estimated.

The methods and the apparatuses disclosed in the above-mentioned Japanese Patent No. 4109076 and Japanese Patent No. 4307511 determine behavior of a target club head by using CAD data of a club head created on a computer. As the CAD data mentioned above does not perfectly match with a shape of an actual club head, a measurement error may occur. In addition, as CAD data of a club head is required, measurement is not easy. The methods and the apparatuses neither measure nor calculate a positional relationship of the club head and the ball. Therefore, a hit point of the ball at the club head cannot be estimated.

Although the above-mentioned Japanese Patent Application No. 2007-167549 describes "a face angle, a blow angle, a lie angle, and a hit point position (toe-heel direction, up-down direction) at impact", it does not specifically disclose the method. It is needless to say that a hit point cannot be obtained in a quantitative manner.

SUMMARY OF THE INVENTION

An object of the present invention is to provide a method for measuring a relationship of behavior of a golf club and behavior of a ball with precision and a system therefor. In addition, the present invention provides a method for measuring behavior of a golf club immediately before or at impact.

A method for measuring behavior of a head of a golf club and a ball includes steps of:

attaching at least three marks to a face surface of a head of a golf club;

at least three club cameras simultaneously photographing the marks at two points in time before the impact;

obtaining multiple pieces of two-dimensional data of the marks from signals of images simultaneously photographed at the two points in time before the impact;

identifying three-dimensional positions of the marks at the two points in time, from the two-dimensional data of the marks at the two points in time;

identifying behavior of the face surface from the three-dimensional position of each mark at the two points in time;

identifying time of a contact of the face surface with the ball by updating in a time series the behavior of the face surface and a positional relationship with the ball;

estimating behavior of the head at the time of contact of the face surface with the ball;

at least two ball cameras simultaneously photographing a hit ball at two points in time;

obtaining multiple pieces of two-dimensional data on the ball from signals of images of the hit ball simultaneously photographed at the two points in time;

identifying a three-dimensional position and posture of the ball at the two points in time from the two-dimensional data of the ball at the two points in time; and estimating a behavior value of the ball from the three-dimensional position and posture of the ball at the two points in time.

Preferably, in the behavior measurement method, the above-mentioned golf club is a wood type golf club. The behavior measurement method further includes a step of attaching band-like marks to a crown of a head of the wood type golf club.

A rotating matrix is determined by calculating a rotation angle of the band-like marks between the two points in time from positional data of the band-like marks at the two points in time. When a three-dimensional position of one of the three marks at any one of the two points in time is not identified, it is estimated by using the rotating matrix.

Preferably, in the behavior measurement method, the above-mentioned golf club is an iron type golf club. The behavior measurement method further includes a step of attaching two spaced marks to a head of the iron type golf club.

A rotating matrix is determined by calculating a rotation angle of the two marks between the two points in time from positional data of the two marks at the two points in time.

When a three-dimensional position of one of the three marks at any one of the two points in time is not identified, it is estimated by using the rotating matrix.

Preferably, in the behavior measurement method, a behavior value of the head is a head speed, a hit point, a face angle or moving loft angle. A behavior value of the ball is a ball speed, a deflection angle, an initial-launch angle, backspin, and sidespin.

The measurement system of behavior of a head of a golf club and a ball according to the present invention includes an upper club camera, a right club camera, and a left club camera that continuously photograph behavior of a head of a golf club, and an upper ball camera and a lateral ball camera that continuously photograph behavior of a golf ball, and a computer.

The upper club camera is arranged above a ball to be hit. The right club camera and the left club camera are spaced and arranged ahead in right and left. The upper ball camera is arranged above a ball to be hit. The lateral ball camera is positioned to either right or left side of a ball to be hit. The club cameras are synchronized and enabled to continuously photograph. The ball cameras are synchronized and enabled to continuously photograph. The computer identifies behavior of the head from image data of the continuously photographed club. The computer identifies time of a contact of a face surface with the ball by updating in a time series a positional relationship of the face surface of the head and the ball from the behavior of the head. A behavior value of the head at the time of contact and a behavior value of the hit ball are measured.

Preferably, in the measurement system, an angle formed by an optical axis of the upper ball camera and an optical axis of the lateral ball camera is 80° or larger and 100° or smaller. Each optical axis of the right camera and the left camera forms an angle to a horizontal line of 30° or larger and 60° or smaller on an XZ plane of three-dimensional orthogonal coordinates of XYZ. The optical axis of the left camera forms an angle to the X axis of 0° or larger and 35° or smaller on an XY plane. The optical axis of the right camera forms an angle to the X axis of −35° or larger and 0° or smaller on the XY plane. The optical axes of the right and left cameras form an angle of 20° or larger and 90° or smaller on the XY plane. The optical axis of the upper camera forms an angle of 80° and larger and 100° or smaller to a vertical line passing through a center of the golf ball.

A method for measuring behavior of a head of a golf club according to the present invention includes steps of:

attaching at least three marks to a face surface of the club head;

obtaining multiple pieces of two-dimensional data of the marks at least two points in time of the club head which is moving, with multiple cameras;

identifying positions of the marks on three-dimensional coordinates from the multiple pieces of two-dimensional data;

identifying the face surface from positional data of three or more marks on the three-dimensional coordinates; and identifying time of a contact of the face surface with the golf ball, by updating in a time series a positional relationship of the face surface and the golf ball.

Preferably, by assuming that positions of the at least three marks are in a state of linear uniform motion, and using a normal vector of a face composed by the three positions, the normal vector passing through a center of the golf ball, time of a contact when the face comes in contact with the golf ball is determined.

Preferably, the positional relationship of the face surface with the golf ball is identified by setting an origin of the three-dimensional coordinates at a center position of the golf ball. Although an origin may be arbitrarily set, it is preferable to set the origin at the center position of the golf ball in order to reduce calculation time by simplifying a calculation formula.

Preferably, two-dimensional coordinates of the face surface are set from positional data on the three-dimensional coordinates of the three or more marks of the face surface.

Preferably, the method further includes steps of obtaining data on three-dimensional coordinates of a contact point at the time of the contact of the face surface with the golf ball, and converting the data on the three-dimensional coordinates of the contact point into the two-dimensional coordinates of the face surface.

Preferably, a moving loft angle of the club head is calculated by using position vectors of the marks on the three-dimensional coordinates and a reference axis vector to be obtained from the position vectors.

Preferably, a face angle of the club head is calculated by using the position vectors of the marks on the three-dimensional coordinates.

Preferably, a blow angle of the club head is calculated by using the position vectors of the marks on the three-dimensional coordinates at the at least two points in time.

Preferably, an angle of approach of the club head is calculated by using the position vectors of the marks on the three-dimensional coordinates at the at least two points in time.

Preferably, the method further includes steps of:
attaching band-like marks to a top part of a crown portion of the club head;
calculating a rotation angle of the band-like marks between the two points in time from each positional data of the band-like marks at the two points in time, and obtaining a rotating matrix; and
from positional data of three or more marks at one point in time of the two points in time and positional data of a smaller number of marks at the other point in time than that at the one point in time, estimating positional data of the mark at the other point in time which has not been obtained by using the rotating matrix.

Alternatively, the method preferably further includes steps of:
attaching at least two marks which are spaced to each other to the top part of the crown portion of the club head;
from each positional data of an imaginary line connecting the two marks on the top part at the two points in time, calculating a rotation angle of an imaginary line between the two points in time and obtaining a rotating matrix; and
from positional data of three or more marks at one point in time of the two points in time and positional data of a smaller number of marks at the other point in time than that at the one point in time, estimating positional data of the mark at the other point in time which has not been obtained by using the rotating matrix.

A system for measuring behavior of a head of a golf club according to the present invention includes:
at least three marks attached to a face surface of a head of a golf club, right camera and left camera which continuously photograph behavior of the club head, and a computer, wherein
the right camera is placed on the right side ahead of a direction of a flying ball, and the left camera is placed on the left side ahead of a direction of a flying ball;
the cameras are synchronized and enabled to continuously photograph, and the computer is such configured to identify positions of the marks on three dimensional coordinates from image data of the continuously photographed club, identify the face surface from this positional data, and identify time of a contact of the face surface with the golf ball, by updating a positional relationship of the face surface and the golf ball in a time series.

Preferably, each optical axis of the right camera and the left camera forms an angle to a horizontal line of 30° of larger and 60° or smaller on an XZ plane of three-dimensional orthogonal coordinates of XYZ where axis Z is vertical,
the optical axis of the left camera forms an angle to X axis of 0° of larger and 35° or smaller on an XY plane,
the optical axis of the right camera forms an angle to X axis of −35° or larger and 0° or smaller on the XY plane, and
the optical axes of the right and left cameras form an angle of 20° or larger and 90° or smaller on the XY plane.

Preferably, the system includes an upper camera for continuously photographing behavior of a head of a golf club, wherein the upper camera is placed above a golf ball to be hit, and an optical axis of the upper camera forms an angle of 80° or larger and 100° or smaller to a vertical line passing through a center of the golf ball.

Preferably, a first mark of marks on the face surface is arranged on a toe side of a vertical imaginary line which passes through a midpoint of the face surface and extends upward and downward on the face surface, and a second mark is arranged on a heel side of the vertical imaginary line,
with one of the first and second marks as a reference mark, a third mark is arranged above or below the reference mark, and
an imaginary line connecting the reference mark with the third mark and an imaginary line connecting the first mark with the second mark form an angle of 85° or larger and 95° or smaller.

DESCRIPTION OF THE PREFERRED EMBODIMENTS

In the following, the present invention will be described in detail on the basis of preferred embodiments, with reference to the drawings, as appropriate.

Figure 1:
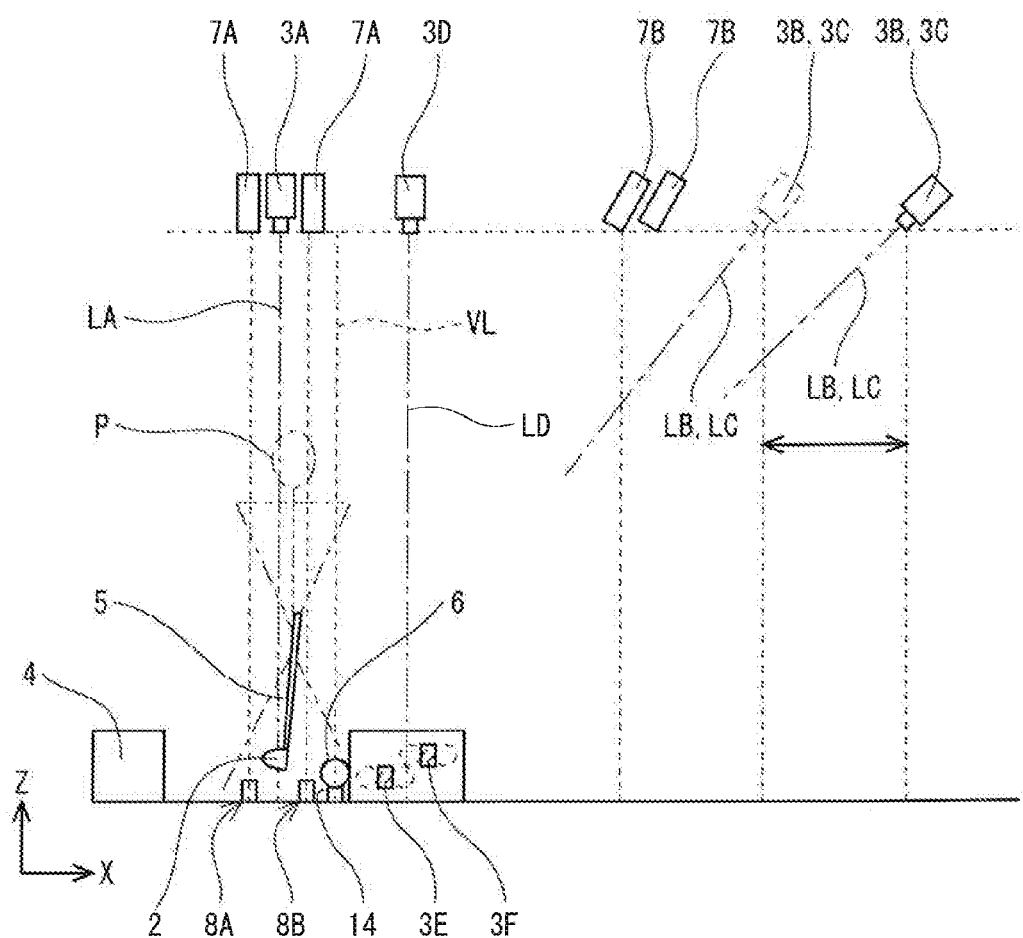
FIG. 1 is a conceptual diagram of a measurement system according to one embodiment of the present invention.
Figure 2:
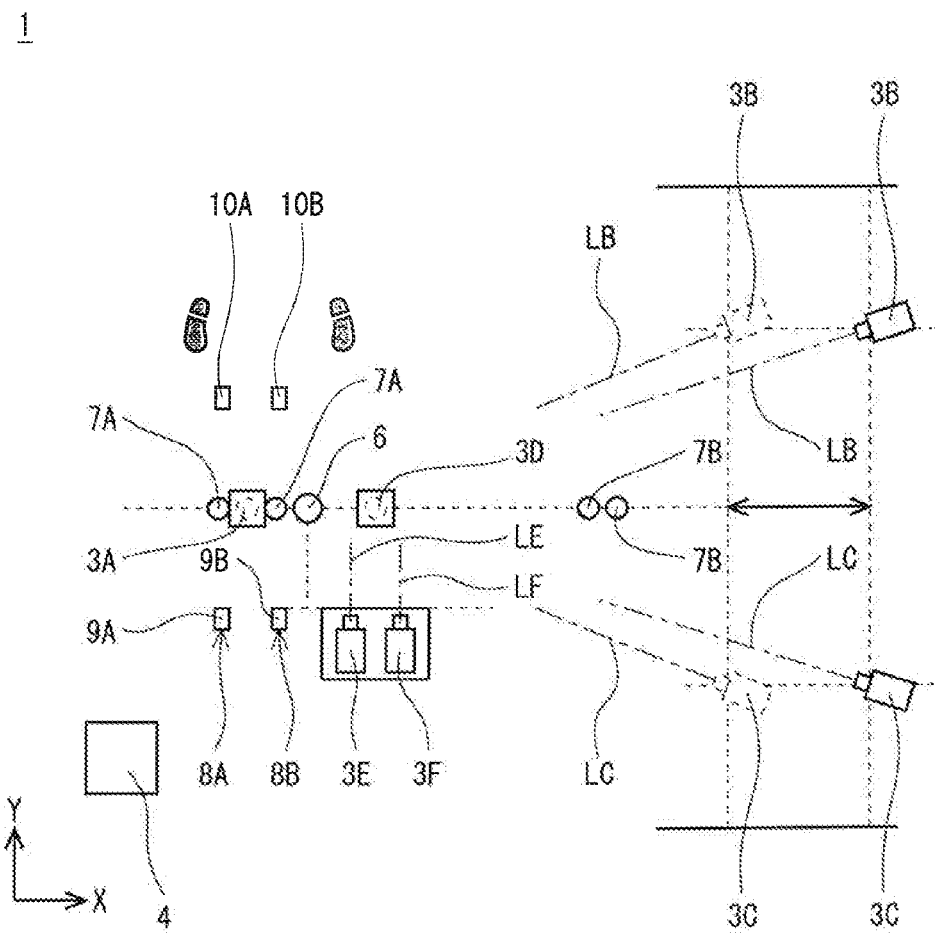
FIG. 2 is a conceptual diagram showing the measurement system of FIG. 1 in a plan view.

FIG. 1 and FIG. 2 show a measurement system 1 as one embodiment of the present invention. The measurement system 1 includes multiple cameras 3, a computer 4, and a golf club 5. The cameras 3 are high-speed cameras capable of continuous photographing. In the measurement system 1, a front-back direction of a golf player P is made a Y axis direction, a direction which is perpendicular and vertical to the Y axis direction is made a Z axis direction, and a direction which is perpendicular to both Y and Z axes and is a ball hit direction (ball flight direction) is made an X axis direction. The XYZ axes constitute three-dimensional coordinates. An origin of the three-dimensional coordinates is set at a center point of a ball 6 which is placed on a fixed position. For example, the ball 6 is placed on a tee 14. A position and a posture of a head 2 are identified on the three-dimensional coordinates.

In the behavior measurement method, behavior of the head 2 of the golf club 5 and behavior of the ball 6 are measured. The measurement system 1 measures behavior of the golf club 5 to be swung by a golf player P and behavior of the ball 6 to be hit by the golf club 5. In the measurement, three-dimensional coordinates of the head 2 being swung are measured in a time line. With the three-dimensional coordinates, three or more points on the head 2 of the golf club 5 are measured.

It is preferable that a method called the DLT (Direct Linear Transformation) method is used to measure three-dimensional coordinates of the golf club 5. The DLT method is described in Japanese Patent No. 2950450, for example. The DLT method has also been commonly used in the field of biomechanics.

The DLT method is a method for obtaining three-dimensional coordinates by using multiple images viewed from different directions. Specifically, it is the method for obtaining one piece of positional data of three-dimensional coordinates from all possible combinations of multiple pieces of positional data of two-dimensional coordinates of a target object from different directions. It is necessary that the multiple pieces of positional data of two-dimensional coordinates is data obtained at a same point in time (images which are photographed simultaneously). The DLT method has fewer limitations on arrangement of the cameras 3 and is highly versatile. The DLT method has also an advantage that it can eliminate a need for information on camera constants such as positions of the cameras 3 in an actual space, a direction of an optical axis, focal length of a lens. In the DLT method, three-dimensional coordinates are re-constructed based on images of known points in the three-dimensional coordinates, namely, points (control points) whose coordinate values in the actual space are known. To set a control point, in general, a reference frame (calibration frame) for which six or more marks, a positional relationship of which is set quantitatively, are formed is used.

Although it is not shown in FIG. 1 and FIG. 2, a mark is attached to a predetermined position of the head 2. A position to which the mark is attached will be described later. Behavior of the mark is measured. Three-dimensional coordinates of this mark is measured by the DLT method described above. Behavior of the head 2 is analyzed based on result of the measurement of the behavior of the mark.

The multiple cameras 3 are connected to the computer 4. The computer 4 has a control unit not shown. The control unit synchronizes the multiple cameras 3 and controls them so that they can photograph. The computer 4 includes a storage unit in which an analysis program is stored and a calculation unit. A typical storage unit is a hard disk. A typical calculation unit is a CPU.

The multiple cameras 3 are placed at mutually different positions. In the embodiment, three club cameras 3A, 3B, and 3C and three ball cameras 3D, 3E, and 3F are used. Out of the three club cameras, one camera (referred to as a first camera) 3A is placed at almost right above a ball set position so that it can photograph behavior of the head 2 immediately before impact. Other two club cameras (referred to as a second camera and a third camera) 3B, 3C are placed in a flying ball line direction so that they can photograph a face surface. The three club cameras 3A, 3B, and 3C are synchronized and triggered.

Specifics are as follows: As an upper club camera of the present invention, the first camera 3A is placed above a position which is slightly behind an origin of an X axis passing through the origin (center of the ball 6). In this embodiment, it is placed at a position (X=−80 mm, Y=0, Z=4000 mm) which is 80 mm behind the origin and 4000 mm above the floor face.

As a right club camera of the present invention, the second camera 3B is placed at a position (X=4000 mm, Y=1250 mm, Z=4000 mm) which is 4000 mm above a position which is 4000 mm ahead the origin of the X axis passing through the origin and 1250 mm in the positive direction of the Y axis. As a left club camera of the present invention, the third camera 3C is placed at a position (X=4000 mm, Y=−1250 mm, Z=4000 mm) which is 4000 mm above a position which is 4000 mm ahead the origin of the X axis passing through the origin and 1250 mm in the negative direction of the Y axis. The second camera 3B and the third camera 3C are enabled to move within a range of 1000 mm in the X axis direction. Specifically, the two cameras 3B, 3C are respectively enabled to adjust a position in a range of 3000 to 4000 mm from the origin.

The second camera 3B and the third camera 3C are preferably placed so that the optical axes thereof are orthogonal to each other because precision of a solution to be obtained by the numerical solution of the DLT method is higher. When a crossed axes angle of both optical axes increases, an angle to be formed by a face surface of the head 2 which is a target of photographing and the optical axis is smaller. Thus, images of multiple marks come closer and become difficult to identify. From this standpoint, an angle to be formed on the XY plane by the optical axis LB of the second camera 3B and the optical axis LC of the third camera 3C is preferably 60° or smaller. In contrast, when the crossed axes angle of both optical axes decreases, the analysis precision to be obtained by the numerical solution of the DLT method is lower. From this standpoint, the angle to be formed by the optical axes is preferably 20° or larger.

From the standpoint of the analysis precision, the second camera 3B and the third camera 3C are preferably placed so that directions of the respective optical axis LB and optical axis LC form an angle ranging from 30° or larger to 60° or smaller, from the set position of the ball 6 to the ground (floor face) on the XZ plane. In addition, a direction of the optical axis LB of the second camera 3B preferably forms an angle to the X axis on the XY plane (in a planar view) ranging from 0° or larger to 35° or smaller (in the positive direction of the Y axis). Preferably, a direction of the optical axis LC of the third camera 3C preferably forms an angle to the X axis in a planar view, ranging from −35° or larger to 0° or smaller.

The number of club cameras is not limited to three units. Four or more cameras 3 may be used. Each of the second camera 3B and the third camera 3C is placed so that it can photograph at least the face surface of the head 2. The first camera 3A is placed so that it can photograph at least a top part (the crown portion of the wood type club head or the top part of the iron type club head) of the head 2.

In the measurement system 1, sandwiching the first camera 3A in the Y axis direction, first strobes 7A are mounted ahead of and behind it. For example, the first strobes 7A are mounted at respective positions of Y=0 and Z=4000 mm, with X being −30 mm or −130 mm. The first strobes 7A irradiate downward and in a vertical direction. Second strobes 7B irradiate an area behind the ball 6 up to about 130 mm on the X axis. The strobes 7 irradiate synchronously with activation of the cameras 3.

A trigger device which determines timing of when to activate the first camera 3A, the second camera 3B, and the third camera 3C and the strobes 7A and 7B is placed behind the ball 6. The trigger device is comprised of two optical sensors 8A, 8B. The optical sensors 8A, 8B have sensed light irradiators 9A, 9B placed opposed, sandwiching the X axis which is a travel path of the head 2 and light receivers 10A, 10B which can receive sensed light. The first optical sensor 8A is located at a position of X=−130 mm, and the second optical sensor 8B is located at a position of X=−30 mm. When the head 2 of the swung golf club 5 shields sensed light, the light receiver 10A, 10B sense this. With shielding and sensing by light receivers 10A, 10B, each sensing point in time is a reference point in time. Based on the reference point in time, the strobes 7 and the cameras 3 operate.

Figure 3A:
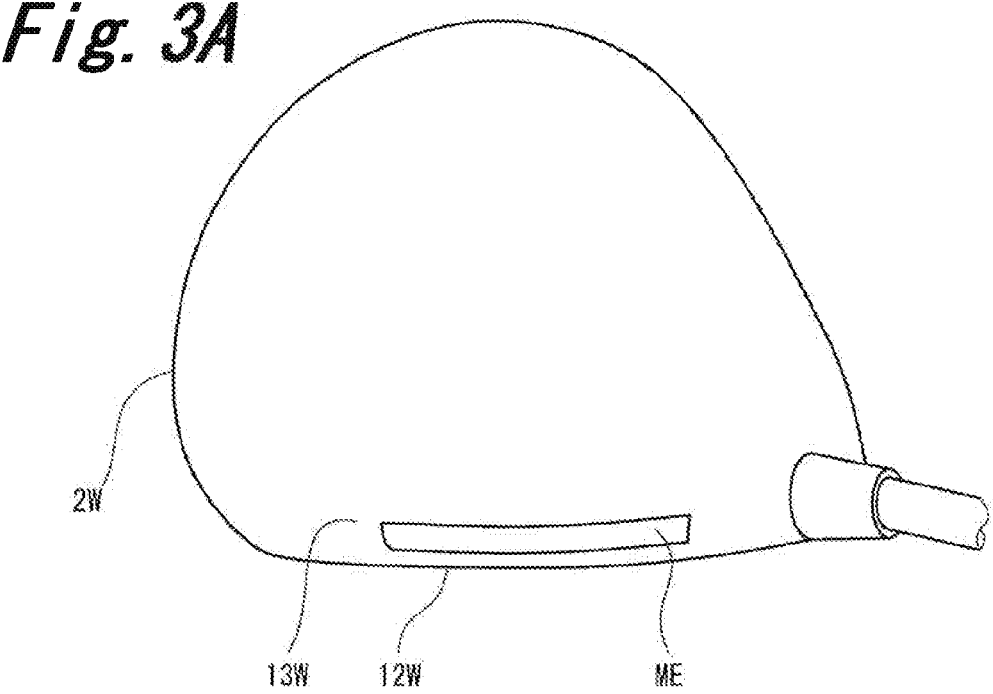
FIG. 3A and FIG. 3B are illustrative views showing a part of a wood type golf club to be used in the measurement system of FIG. 1.
Figure 3B:
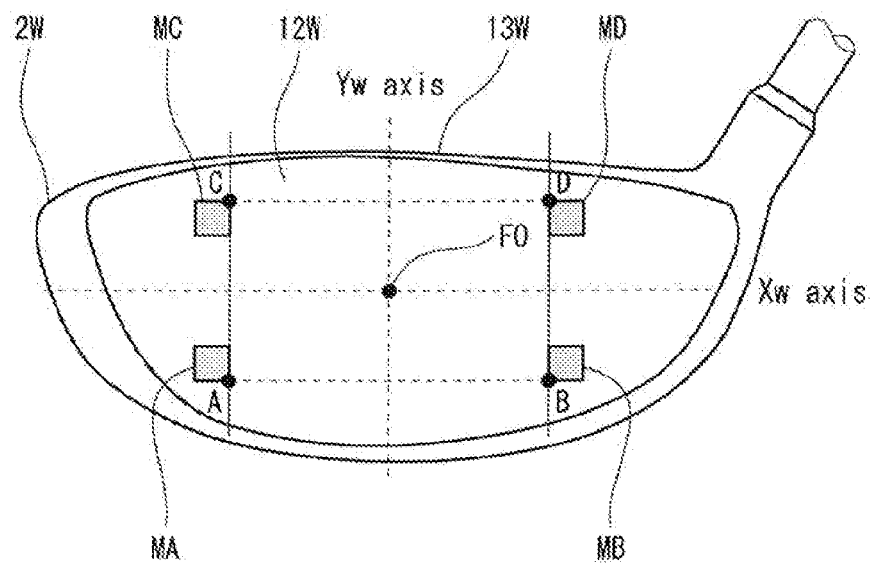

FIG. 3 and FIG. 4 show a position in the head 2 where marks are formed. FIG. 3 shows a head 2W of a wood type golf club. FIG. 3A is a plan view of the head 2W and FIG. 3B is a front view of the head 2W. Four marks MA, MB, MC, MD are formed on a face surface 12W. As these marks, reflection marks all of which are of a prism type are adopted. A face center FO is set on the face surface 12W. A vertical imaginary line passing through the face center FO and extending over the face surface 12W in up and down directions is made a Yw axis. A horizontal imaginary line passing through the face center FO perpendicular to the Yw axis, and extending to the toe-heel direction on the face surface 12W is made an Xw axis. The four marks MA, MB, MC, MD are located at four vertices of a rectangle on the face surface 12W. Two sides AC, BD are parallel to the Yw axis, and two sides AB, CD are parallel to the Xw axis. An intersection point of the imaginary line AD and the imaginary line BC is the face center FO.

The face center FO can be set at any position which seems to be reasonable to obtain positional data to be described hereinafter. Firstly, the face center FO can be identified from width and height of the face surface 12W. Secondly, a center of gravity of the face surface 12W can be set as the face center FO. Thirdly, the face center FO can be identified from a positional relationship of the position of the center of gravity of the entire head 2W and the face surface 12W.

As an example, a method for setting the face center FO from the width and the height of the face surface 12W will be described hereinafter. First, the head 2W is placed on a horizontal surface so as to have a predetermined real loft angle (the face angle being 0) and a lie angle. Specifically, the golf club 5 is fixed to the posture mentioned above. A most toe-side point on the face surface 12W (face most toe-side point) of the head 2W in this posture is identified, and a most heel-side point (face most heel-side point) is identified. A horizontally spaced distance of the face most toe-side point and the face most heel-side point is identified as face width. A surface (perpendicular surface) passing through a center point of the face width and being perpendicular to the horizontal surface and perpendicular to the face surface 12W at the center point is identified. A line (vertical line) of intersection on the face surface of the perpendicular surface and the face surface 12W is identified. An uppermost point (face uppermost point) of the vertical line on the face surface is identified. Then, a lowermost point (face lowermost point) of the vertical line on the face surface is identified. A center point of an imaginary line connecting the face uppermost point and the face lowermost point is set as face center FO. A method for setting the face center FO is an example.

For the wood type head 2W, a band-like mark ME is formed on a top (top part) 13W of a crown portion thereof. As shown in FIG. 3A, the top part 13W is a member adjacent to the face surface 12W on a top surface of the crown portion. The band-like mark ME extends over the top portion 13W in the toe-heel direction. The band-like mark ME is formed at a position where it can be easily photographed by the first camera 3A described above.

Figure 4A:
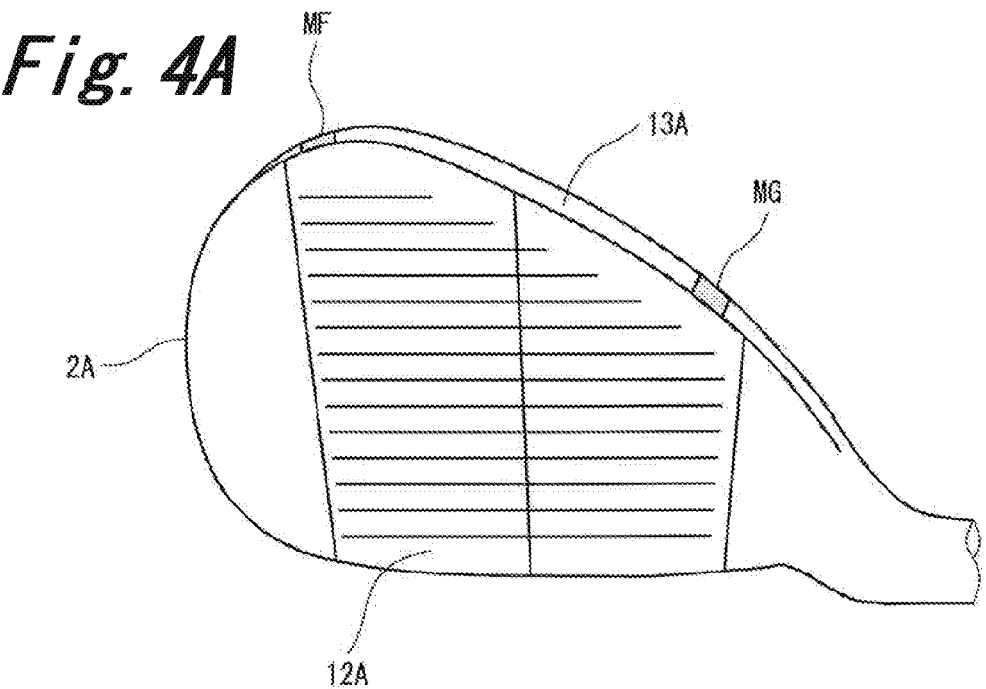
FIG. 4A and FIG. 4B are illustrative views showing a part of an iron type golf club to be used in the measurement system of FIG. 1.
Figure 4B:
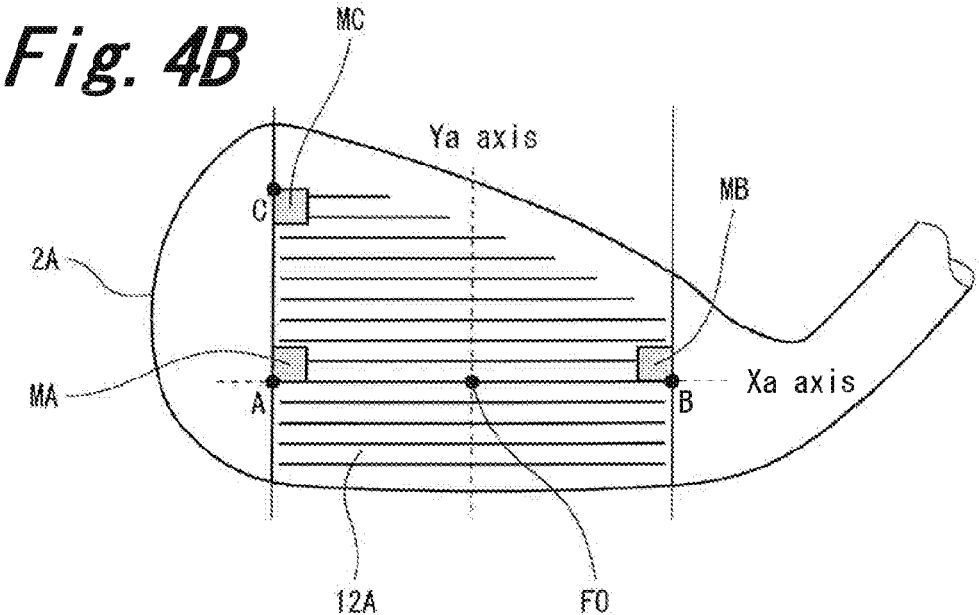

FIG. 4 shows a head 2A of an iron type club, called sandwedge, having a large loft angle. FIG. 4A is a plan view of a head 2A, and FIG. 4B is a front view of the head 2A. Three marks MA, MB, MC are formed on the face surface 12A.

For the marks MA, MB, MC, a reflective tape which is a tape of glass beads is used as a reflection mark. For a golf club whose loft angle is small, it is preferable to use a reflection mark of a prism type, as light reflected by the reflection mark is not easily photographed. In contrast, for a golf club whose loft angle is large, there is no need to use a reflection mark of a prism type, in particular, as light reflected by the reflection mark is easily photographed. Hence, for the golf club whose loft angle is large, it is preferable to use a reflective tape of a glass bead type which is lower-cost, and the like. Specifically, a reflection mark of a prism type is preferable for a golf club whose loft angle is 25° or smaller. It is more preferable for a golf club whose loft angle is 20° or smaller. It is particularly preferable for a club whose loft angle is 15° or smaller. On the one hand, from the standpoint of cost reduction, a reflective tape of a glass bead type and the like is preferable for a club whose loft angle is 16° or larger. It is more preferable for a club whose loft angle is 21° or larger. It is particularly preferable for a club whose loft angle is 26° or larger.

All of these marks MA, MB, MC are formed at a blasted part on the center side of the face surface 12A. This is because at both ends in the toe-heel direction, identification of marks is likely to be difficult, as the face surface 12A itself easily reflects. The face center FO is set on the face surface 12A. Similar to the above wood type head 2W, an Xa axis which is a horizontal imaginary line and a Ya axis which is a vertical imaginary line are set. The three marks MA, MB, MC are located at three vertices A, B, C of a rectangular triangle on the face surface 12A. The base AB matches the Xa axis. The face center FO is a midpoint of the base AB. The side AC is parallel to the Ya axis.

The face center FO of the head 2A of an iron type club can also be set with various types of setting methods described above. In addition, it can be set with the following method. First, postures of target golf clubs 5 are fixed so that each golf club 5 will have a predefined lie angle. An across-the-width center point of a face material of the face surface (an area surrounded by a straight line passing through AC in FIG. 4B and a line passing through B and being parallel to the line AC, for example) is identified, and a vertical line (vertical centerline) passing through the center point is identified. An uppermost point (face uppermost point) of the vertical centerline on the face material is identified. Next, a lowermost point (face lowermost point) of the vertical centerline on the face material is identified. A center point of an imaginary line connecting the face uppermost point and the face lowermost point is set as a face center. The method for setting a face center is one example.

For the iron type head 2A, two marks MF, MG are formed on a top part 13A thereof. As shown in FIG. 4A, the top part 13A is a member on the top surface of the crown portion and adjacent to the face surface 12A. The two marks MF, MG formed on the top part 13A are spaced to each other in the toe-heel direction. The two marks MF, MG are formed in positions which can be easily photographed by the first camera 3A described above.

Although four marks are formed on a face surface 12W of a wood type head 2W in the embodiment, the number of marks is not limited to four. It may be three, or five or more. Although the three marks are formed on the face surface 12A of the iron type head 2A, the number of marks is not limited to three, and may be four or more. Marks on the face surface 12A are needed at least at three positions which can constitute a face. Specifically, at least three marks which are not aligned are needed. This is because the face surface 12 of the head 2 needs to be identified.

Positions of marks MA, MB, MC, MD are not limited to those in the above embodiment. It is preferable that any one (first mark) of the marks on the face surface 12 is arranged on the toe side of the Ya axis and the Yw axis (hereinafter represented by the Ya axis), any one (second mark) of the other marks is arranged on the heel side of the Ya axis, any one (third mark) of the other marks is further arranged above or below any one mark (referred to as a reference mark) of the first and the second marks, and an imaginary line connecting the reference mark with the third mark and an imaginary line connecting the first mark with the second mark form an angle of 85° of larger and 95° or smaller. The most preferable angle is 90°. In the embodiment, the mark MA in FIG. 3B and FIG. 4B corresponds to the reference mark. It is further preferable that such the first, second, and third marks meet at least one requirement of the following (a) to (e):

(a) The reference mark is preferably arranged on the toe side of the Ya side. This is because, in general, the face surface 12 is wider on the toe side than on the heel side, and thus multiple marks can be widely distributed and arranged. Consequently, a situation in which adjacent marks are both hidden behind the ball 6 can be avoided.

(b) The first mark and the second mark are preferably arranged so that the imaginary line connecting them is bisected by the Ya axis. This is because the face center FO can be easily calculated. Furthermore, it is because a situation in which the marks are hidden behind the ball 6 when the ball 6 collides with vicinity of center of the face surface 12 can be avoided.

(c) The first mark and the second mark are preferably arranged so that the imaginary line connecting them are orthogonal to the Ya axis. This is because a "hit point" can be defined by a distance in each up, down, right and left direction from the face center FO when three-dimensional coordinates are converted into two-dimensional coordinates. Consequently, it is easier to imagine which position of the face surface 12 the ball 6 collides with.

(d) A spaced distance between the first mark and the second mark (actual length of the imaginary line connecting both marks. This also applies hereinafter) is preferably 40 mm or more, and more preferably 45 mm or more. This is because a situation in which adjacent marks are both hidden behind the ball 6 can be avoided. The spaced distance can be set in the range of size of the face surface 12, and usually can be set to 80 mm or less, and furthermore to 70 mm or less. In the embodiment, the spaced distance is set to 60 mm for both the wood type club head 2W and the iron type club head 2A.

(e) A spaced distance between the reference mark and the third mark is preferably 22 mm or more, and more preferably 24 mm or more. This is because a situation in which adjacent marks are both hidden behind the ball 6 can be avoided. The spaced distance can be set in the range of size of the face surface 12, and usually can be set to 50 mm or less, and furthermore to 40 mm or less. In the embodiment, the spaced distance is set to 30 mm for the wood type club head 2W and 25 mm for the iron type club head 2A.

With the measurement system 1 described above, three-dimensional data such as a position and a posture of the head 2 is obtained in a time series by using the DLT method. Based on the three-dimensional data obtained, a positional relationship of the face surface 12 and the ball 6 on the three-dimensional coordinates is updated in a time series, and a point in time of contact (impact time) of the face surface 12 with the ball 6 is identified. Finally, behavior of the head 2 at the impact is estimated. The behavior is, for example, moving loft angle, a face angle (angular aperture), a blow angle, an angle of approach, a hit point and the like.

As shown in FIG. 1 and FIG. 2, as an upper ball camera of the present invention, one ball camera (referred to as a fourth camera) 3D of the multiple cameras 3 is placed above a position which is slightly ahead from the origin (center of the ball 6) in the X axis direction. In the measurement system 1, the ball camera 3D is placed at a position (X=195 mm, Y=0, Z=4000 mm) which is 4000 mm above the position which is 195 mm ahead from the origin.

Other one ball camera (referred to as a fifth camera) 3E is a first ball camera as a lateral ball camera of the present invention. A remaining one ball camera (referred to as a sixth camera) 3F is a second lateral ball camera as a lateral ball camera of the present invention. The fifth camera 3E and the sixth camera 3F are at positions which are almost same as the fourth camera 3D in the front-back direction, and arranged at the positions below the fourth camera 3D. The fifth camera 3E and the sixth camera 3F are arranged at almost same height as the ball 6. Here, the sixth camera 3F is arranged at the position higher in the Z axis direction than the fifth camera 3E.

The fifth camera 3E and the sixth camera 3F, are placed so that they can photograph at least a surface of the ball 6 seen from the lateral side. The fourth camera 3D is placed so that it can photograph at least a surface of the ball 6 seen from the above. An angle formed by an optical axis of the upper ball camera (forth camera) 3D and optical axes of the lateral ball cameras (fifth camera and sixth camera) 3E, 3F is 80° of larger and 100° or smaller. Preferably, the fourth camera 3D, the fifth camera 3E, and the sixth camera 3F are such arranged that optical axes thereof are orthogonal to each other, because this makes the measurement precision of a three-dimensional position of the ball 6 higher.

The fourth camera 3D and the fifth camera 3E are synchronized and triggered. The fourth camera 3D and the sixth camera 3F are synchronized and triggered. Here, although three cameras from the fourth camera 3D to the sixth camera 3F are shown, the number of cameras is not limited to 3. Four or more cameras 3 may also be used.

Third strobes 7C are mounted in front and in the back of the fifth camera 3E, sandwiching it in the X axis direction. Fourth strobes 7D are mounted in front and in the back of the sixth camera 3F, sandwiching it in the X axis direction. The third strobes 7C and the fourth strobes 7D irradiate to the Y axis direction. The third strobes 7C irradiate synchronously with activation of the fifth camera 3E. The fourth strobes 7D irradiate synchronously with activation of the sixth camera 3F.

Based on sensing by the trigger device (optical sensors 8A, 8B) described above, a reference point in time is determined. At one predetermined time in point based on the reference point in time, the third strobes 7C operate in response to photographing of the fourth camera 3D and the fifth camera 3E. At other predetermined point in time based on the reference point in time, the fourth strobes 7D operate in response to photographing of the fourth camera 3D and the sixth camera 3F.

Figure 5A:
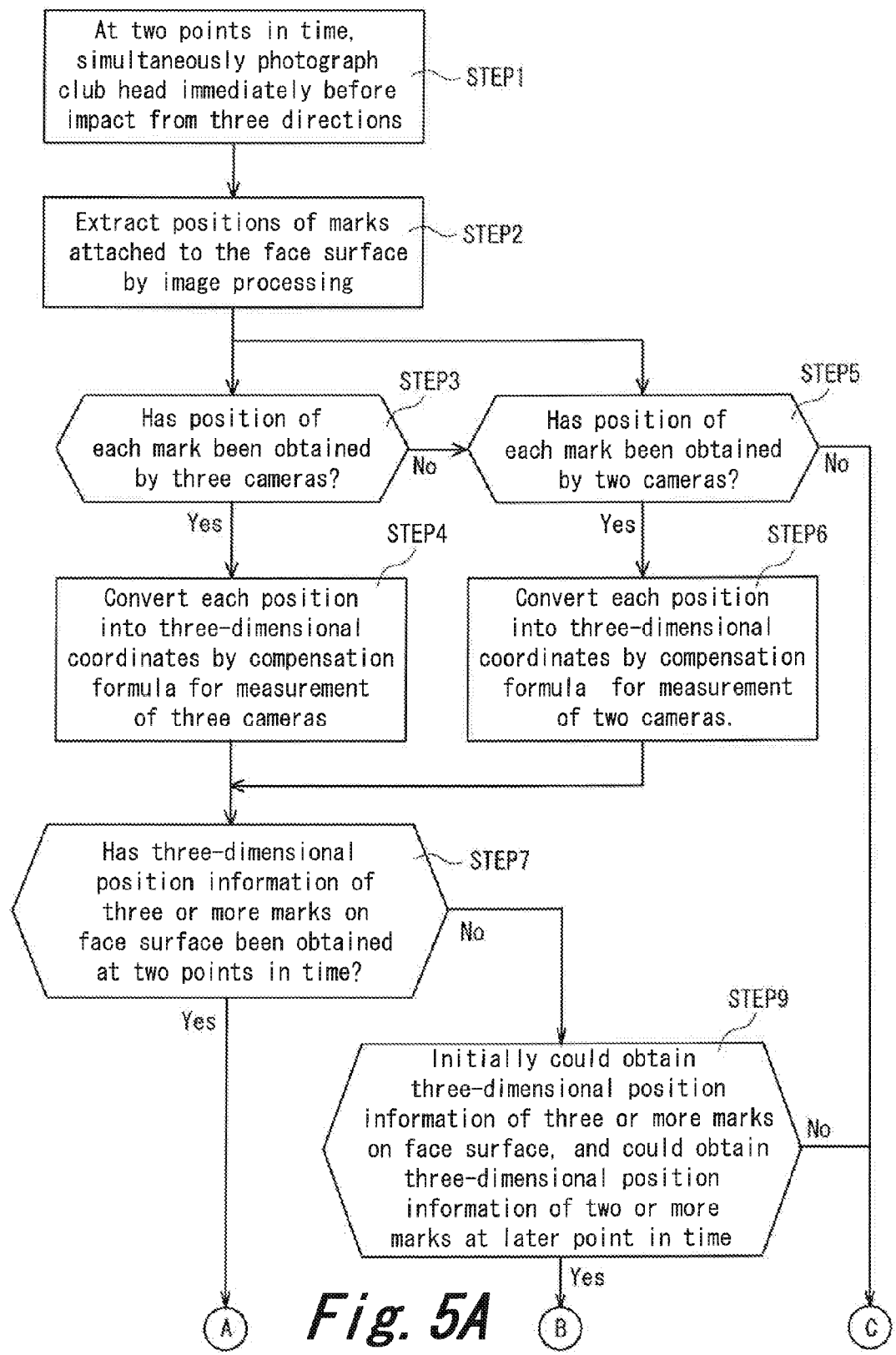
FIG. 5A and FIG. 5B are flow charts showing a method for measuring behavior of a club head according to one embodiment of the present invention.

One example of estimation of behavior of the head 2 at the impact will be described with reference to the flow chart of FIG. 5A, FIG. 5B and FIG. 6 to FIG. 9. In FIG. 5A, the head 2 immediately before the impact is simultaneously photographed by the three cameras 3 of the first camera 3A to the third camera 3C described above (STEP 1). The photographing takes place at each of two points in time, for example. Then, positions of multiple marks on the face surface 12 are extracted from photographed images by image processing (STEP 2). The multiple marks mentioned above mean four marks for a wood type club head and three marks for an iron type club head. However, three marks may be alternatively used for the wood type club head.

When a position of each mark is extracted in every photographed image of the three cameras 3 (STEP 3), each position is converted into three-dimensional coordinates by a compensation formula (to be provided by the DLT method) for measurement of the three cameras (STEP 4). When a position of each mark is extracted in photographed images of only two cameras 3 of the three cameras (STEP 5), each position is converted into three-dimensional coordinates by a compensation formula (to be provided by the DLT method) for measurement of the two cameras (STEP 6). For example, when only two cameras, the second camera 3B and the third camera 3C, are used (STEP 5), each position is converted into three-dimensional coordinates by a compensation formula (to be provided by the DLT method) for measurement of the two cameras of the second camera 3B and the third camera 3C (STEP 6).

The compensation formula to be provided by the DLT method is stored in the computer. The compensation formula for measurement of the three cameras has been determined in advance based on images of control points photographed by the first camera 3A, the second camera 3B, and the third camera 3C. The compensation formula for measurement of the two cameras of the first camera 3A and the second camera 3B has been determined in advance based on images of the control points photographed by the first camera 3A and the second camera 3B. The compensation formula for measurement of the two cameras of the first camera 3A and the third camera 3C has been determined in advance based on images of the control points photographed by the first camera 3A and the third camera 3C. The compensation formula for measurement of the two cameras of the second camera 3B and the third camera 3C has been determined in advance based on images of the control points photographed by the second camera 3B and the third camera 3C. As the conversion from two-dimensional coordinates into three-dimensional coordinates of the (STEP 1) to (STEP 6) is performed by the publicly known DLT method, a detailed description will be omitted.

It is judged whether three-dimensional position information of three or more marks on the face surface at each of two points in time could be obtained (STEP 7). When the three or more pieces of the three-dimensional position information could be obtained, a position of the face surface 12 at the impact is estimated from positions of the face surface 12 at two points in time, as described hereinafter, and a position of a contact point of the face surface 12 with the ball 6 on the three-dimensional coordinates is calculated (STEP 8). In the (STEP 8), time of a contact of the face surface 12 with the ball 6 is identified and a contact point is estimated, by updating in a time series a positional relationship of the face surface 12 and the ball 6 on the three-dimensional coordinates.

Figure 5B:
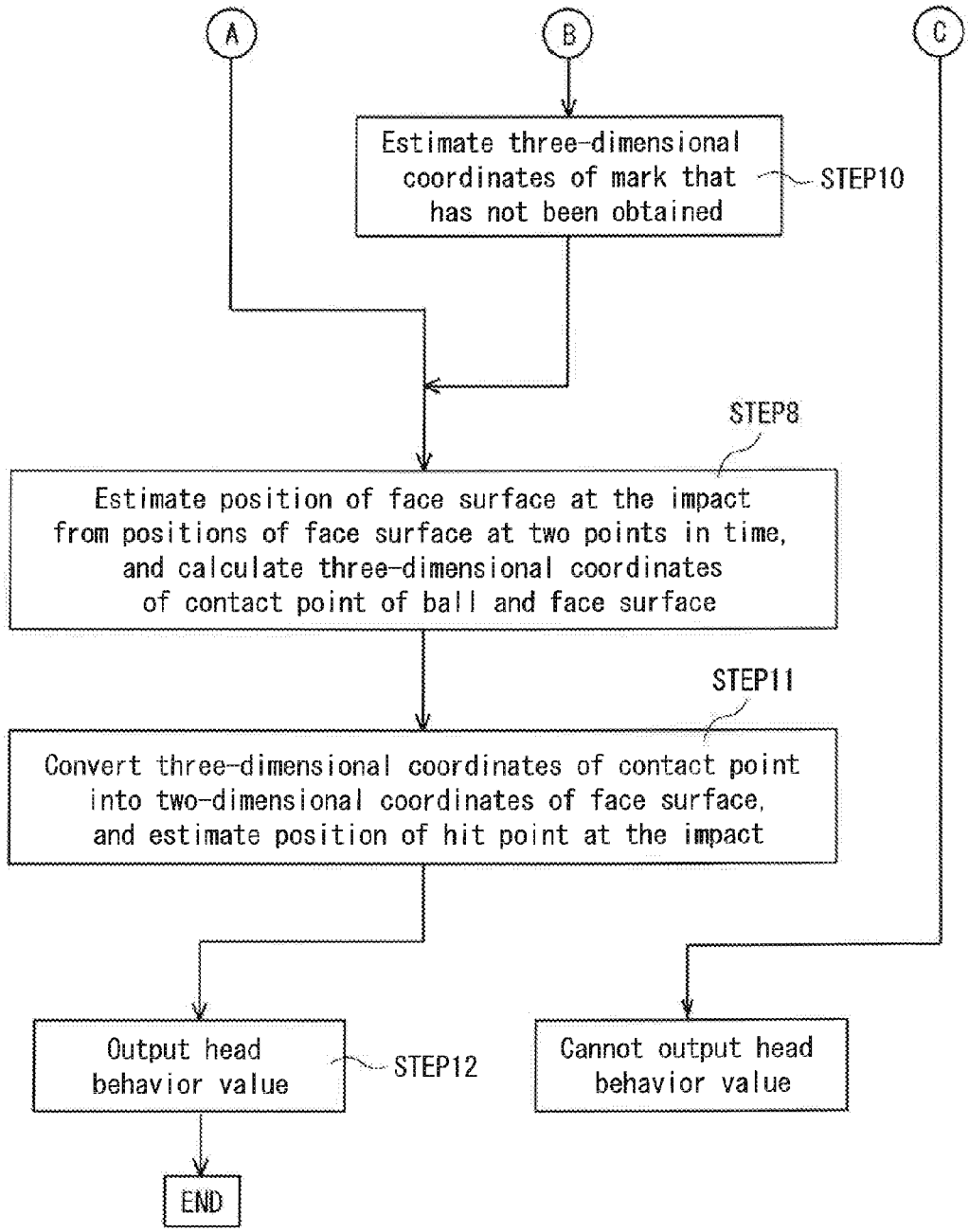

When only position information of a smaller number of the marks than that obtained at one of the two points in time could be obtained at the other one of the two points in time (STEP 9), although the three-dimensional position information of the three or more marks could be obtained at any one of the two points in time, as shown in FIG. 5B, a position of the mark on the three-dimensional coordinates which could not be obtained on the other one time in point is estimated (STEP 10). More specifically, this is the case in which for four marks formed on the face surface 12W of the head 2W of the wood type golf club, although three-dimensional position information of the four marks could be initially obtained, two marks were not photographed as they were hidden behind the ball 6 at a later point in time, and thus three-dimensional position information thereof could not be obtained (STEP 9). In this case, the three-dimensional position information of the two marks which could not be obtained at the later point in time is estimated based on a two-dimensional rotation angle of the band-like mark ME on the top part 13W (STEP 10). The method for estimation will be described later. A position of the face surface 12 at the impact is estimated from positions of the face surface 12 at the two points in time, and a position of a contact point of the face surface 12 with the ball 6 on the three-dimensional coordinates is calculated (STEP 8).

The three-dimensional coordinates of the calculated contact point of the face surface 12 with the ball 6 are converted into coordinates of the face surface 12 which are two-dimensional coordinates (STEP 11), and a behavior value of the head 2 at the impact is output (STEP 12).

Figure 6:
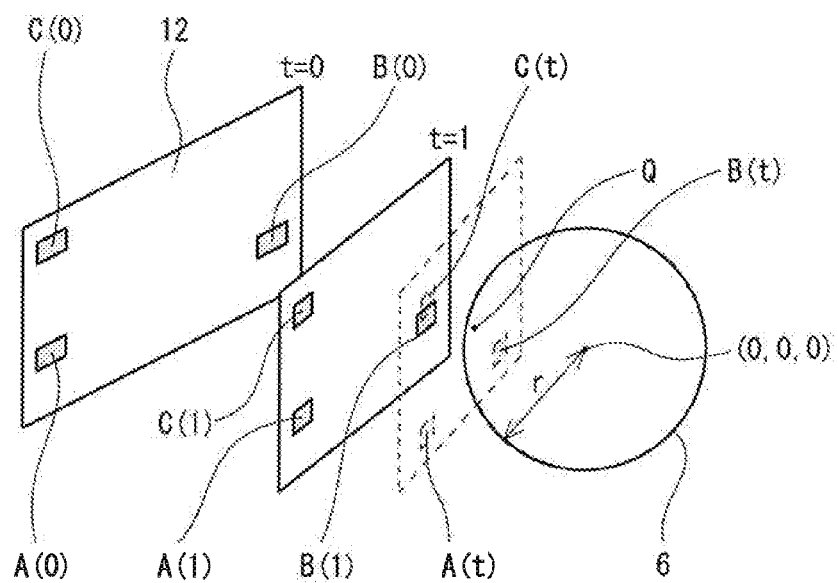
FIG. 6 is an illustrative view of the method for measuring behavior of the club head at impact.
Figure 7:
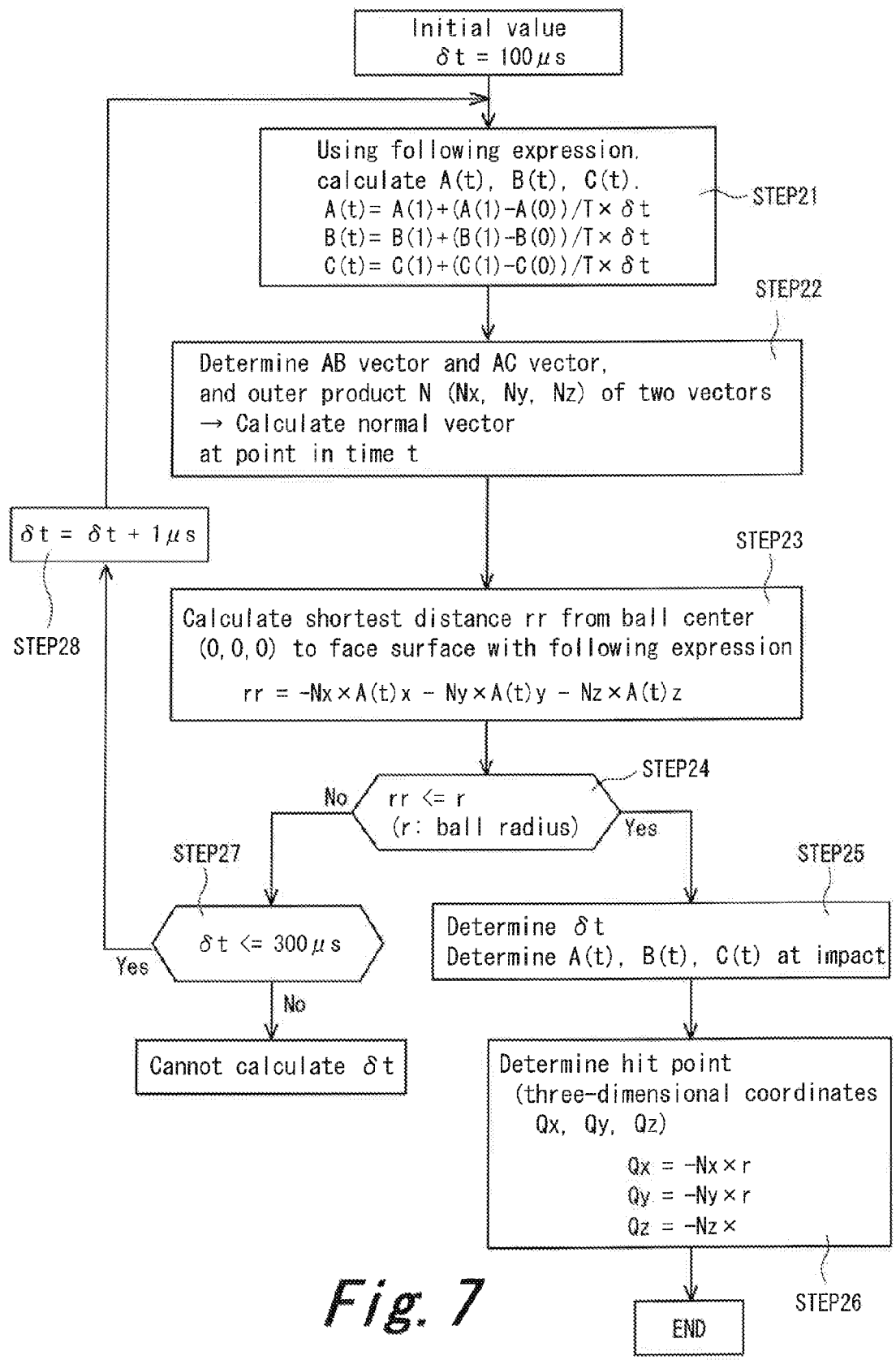
FIG. 7 is a flow chart showing a procedure for calculating three-dimensional coordinate positions of contact points of a face surface and a ball.

With reference to FIG. 6 and FIG. 7, calculation of a position of a contact point of the face surface 12 with the ball 6 on the three-dimensional coordinates in the (STEP 8) above will be described hereinafter. As shown in FIG. 6, three marks are formed on the face surface 12 of the head 2 as shown. Positions of the marks are shown by respective points A (t), B (t), C (t). An early point in time of the two points in time mentioned above is made t=0, and a later point in time is made t=1. The basic idea of calculation of a position of the contact point on the three-dimensional coordinates is to determine a time in point when the ball 6 comes in contact with a face comprised of the three points A(t) B (t), C (t) on the assumption that the three points A(t), B (t) C (t) are in a state of linear uniform motion, and to determine each coordinate of the above positions A(t), B(t), C(t) and of the contact point (hit point Q) at that point in time. The origin (0, 0, 0) of the three-dimensional coordinates is the center point of the ball shown in FIG. 6.

Coordinate positions of the points A, B, C at the point in time t are A(t), B(t), C(t). Assume that a time interval between t=0 and t=1 is T. The time T is a measured value of a light shielding time interval. The light shielding time interval is an interval of time from when the head 2 shields sensed light of the first optical sensor 8A as shown in FIG. 2 till time when it shields sensed light of the second optical sensor 8B. With the above, the coordinate positions A (t), B (t), C(t) are represented by the following expression (1):

$$A(t)=A(1)+(A(1)-A(0))/T \times \delta t$$

$$B(t)=B(1)+(B(1)-B(0))/T \times \delta t$$

$$C(t)=C(1)+(C(1)-C(0))/T \times \delta t \quad (1)$$

In this expression, $\delta t$ is a calculation time interval. An initial value of $\delta t$ is set to 100 µs (microseconds) and an end value to 300 µs, for example, and an increment step is set to 1 µs, for example. A radius of the ball 6 is set to r, for example.

In the flow chart of FIG. 7, the coordinate positions A (t), B(t), C(t) are calculated with the above expression (1) (STEP 21). An AB vector and an AC vector at the time t are calculated. Then, an outer product N (Nx, Ny, Nz) of both vectors above is calculated (STEP 22). The outer product N of the vectors is a normal vector. The normal vector is a unit vector. The normal vector is a vector (face surface vector) perpendicular to the face surface 12.

By using the A(t), B(t), C(t) and the normal vector N, a shortest distance rr between the center (0,0,0) of the ball 6 and the face surface 12 is calculated with the following expression (2) (STEP 23):

$$rr=-Nx \times A(t)x-Ny \times A(t)y-Nz \times A(t)z \quad (2)$$

It is judged whether or not the shortest distance rr is equal to or smaller than the radius r of the ball 6 (STEP 24). When it is equal to or smaller than the radius r, it is determined that $\delta t$ at that point in time is $\delta t$ at the impact, and the coordinate positions A(t), B(t), C(t) at the impact are determined (STEP 25). Then, the hit point Q (Qx, Qy, Qz) on the three-dimensional coordinates at the impact is determined with the following expression (3) (STEP 26).

$$Qx=-Nx \times r$$

$$Qy=-Ny \times r$$

$$Qz=-Nz \times r \quad (3)$$

In the (STEP 24) above, while the shortest distance rr is not equal to or smaller than the radius r of the ball, and while $\delta t$ is not 300 µs, $\delta t$ is replaced by $\delta t+1$ µs (STEP 28), and the above (STEP 21) to (STEP 24) are repeated. The hit point Q (Qx, Qy Qz) determined with the above calculations is the position on the three-dimensional coordinates.

A position and a posture of the face surface 12 at the impact are identified from the coordinate positions A(t), B(t), C(t) at the impact. A relative position of the face surface 12 and the ball 6 at the impact is identified from the hit point Q (Qx, Qy, Qz)

A behavior value of the head 2 at the impact is estimated from the position and the posture of the face surface 12 at the impact and the hit point Q (Qx, Qy, Qz). For example, estimated values of the club behavior include a head speed, a moving loft angle, a face angle, a blow angle, an angle of approach and the like, for example. Some of them will be described later. With the behavior measurement method of the head 2 by using the measurement system 1, behavior of the head 2 immediately before and at the impact is measured and estimated.

[Estimation of a Position which has not been Obtained]

Estimation of a mark position which has not been obtained at any point in time in STEP 9 and STEP 10 in FIG. 5A and FIG. 5B will be described hereinafter.

Figure 8:
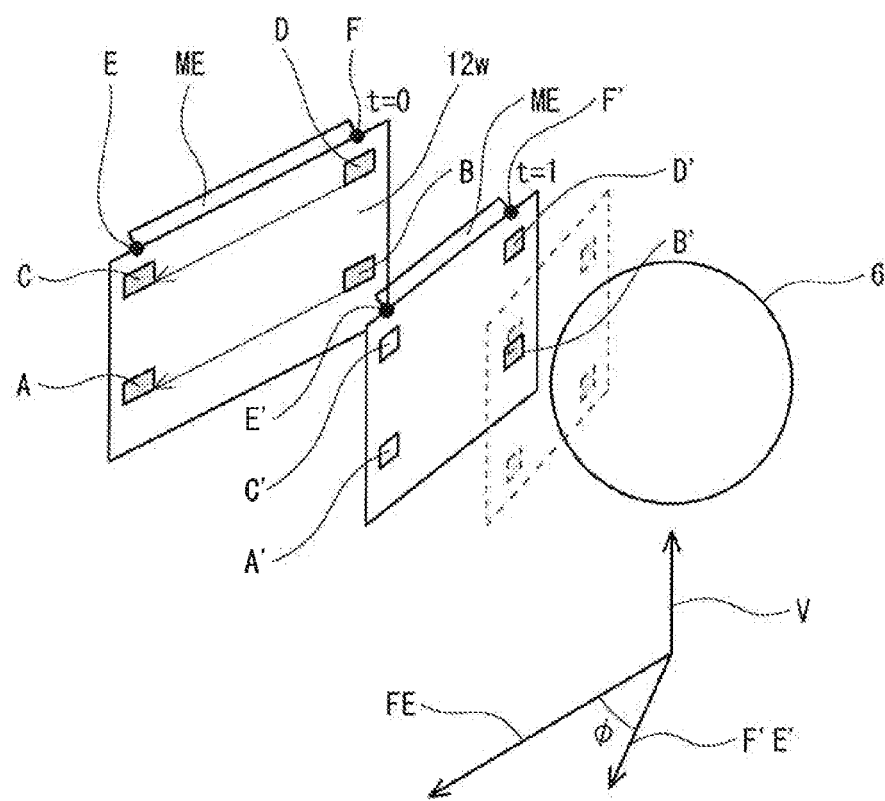
FIG. 8 is an illustrative view for estimating a position on the three dimensional coordinates of a toe-side mark which has not been photographed.

FIG. 8 shows a face surface 12W of a head 2W of a wood type golf club at two points in time, t=0 and t=1. At t=0, positions A, B, C, D of four marks are all extracted. At t=1, two marks on the toe side are not photographed as they are hidden behind a ball 6, and the two positions A', C' are not extracted. Two positions B', D' on the heel side are extracted. In FIG. 8, the positions A', C' which are not extracted, are shown in white. A band-like mark ME formed on a top part 13W can be almost reliably photographed by a first camera 3A (see FIG. 1 and FIG. 2). End positions of the band-like mark ME in a longitudinal direction are point E and point F.

The basic idea of estimation of the above two positions A', C' is to determine a D'C' vector (DCx1, DCy1, DCz1) and a B'A' vector (BAx1, Bay1, BAz1) at t=1, by using a DC vector (DCx0, DCy0, DCz0) and a BA vector (BAx0, Bay0, BAz0) at t=0. Then, a rotation angle from t=0 to t=1 of an FE vector of the end positions of the band-like mark ME is used.

Firstly, an FE vector (FEx0, FEy0, FEz0) at t=0 and an F'E' vector (FEx1, FEy1, Fez1) at t=1 are determined. Now, $$\vec{FE_{x0}} = E_{x0} - F_{x0}, \vec{FE_{y0}} = E_{y0} - F_{y0}, \vec{FE_{z0}} = E_{z0} - F_{z0},$$

$$\vec{FE_{x1}} = E_{x1} - F_{x1}, \vec{FE_{y1}} = E_{y1} - F_{y1}, \vec{FE_{z1}} = E_{z1} - F_{z1}$$

In addition, the arrow → is attached to a top of the vectors shown in a mathematical expression to show that they are vectors.

Secondly, an outer vector V (Vx, Vy, Vz) of the FE vector at t=0 and the F'E' vector at t=1 is determined. Here, Vx, Vy, Vz are respectively determined with the following expression (4), expression (5), expression (6). Note that sqrt signifies a square root in ( ).

$$Vx = (\vec{FEy0} \cdot \vec{FEz1} - \vec{FEy1} \cdot \vec{FEz0}) / sqrt((\vec{FEy0} \cdot \vec{FEz1} - \vec{FEy1} \cdot \vec{FEz0})^2 + (\vec{FEz0} \cdot \vec{FEx1} - \vec{FEz1} \cdot \vec{FEx0})^2 + (\vec{FEx0} \cdot \vec{FEy1} - \vec{FEx1} \cdot \vec{FEy0})^2) \quad (4)$$

$$Vy = (\vec{FEz0} \cdot \vec{FEx1} - \vec{FEz1} \cdot \vec{FEx0}) / sqrt((\vec{FEy0} \cdot \vec{FEz1} - \vec{FEy1} \cdot \vec{FEz0})^2 + (\vec{FEz0} \cdot \vec{FEx1} - \vec{FEz1} \cdot \vec{FEx0})^2 + (\vec{FEx0} \cdot \vec{FEy1} - \vec{FEx1} \cdot \vec{FEy0})^2) \quad (5)$$

-continued $$V_z = (\overrightarrow{FEx0} \cdot \overrightarrow{FEy1} - \overrightarrow{FEx1} \cdot \overrightarrow{FEy0}) / \qquad (6)$$
$$sqrt((\overrightarrow{FEy0} \cdot \overrightarrow{FEz1} - \overrightarrow{FEy1} \cdot \overrightarrow{FEz0})^2 +$$
$$(\overrightarrow{FEz0} \cdot \overrightarrow{FEx1} - \overrightarrow{FEz1} \cdot \overrightarrow{FEx0})^2 +$$
$$(\overrightarrow{FEx0} \cdot \overrightarrow{FEy1} - \overrightarrow{FEx1} \cdot \overrightarrow{FEy0})^2)$$

Thirdly, an angle $\phi$ formed by the FE vector at $t=0$ and the F'E' vector at $t=1$ is determined with the following expression (7). Note that a cos signifies an arc cosine.

$$\phi = \operatorname{acos}((\overrightarrow{FE_{x0}} \cdot \overrightarrow{FE_{x1}} + \overrightarrow{FE_{y0}} \cdot \overrightarrow{FE_{y1}} + \overrightarrow{FE_{z0}} \cdot \overrightarrow{FE_{z1}}) / \qquad (7)$$
$$(sqrt(\overrightarrow{FE_{x0}^2} + \overrightarrow{FE_{y0}^2} + \overrightarrow{FE_{z0}^2}) \cdot sqrt(\overrightarrow{FE_{x1}^2} + \overrightarrow{FE_{y1}^2} + \overrightarrow{FE_{z1}^2}))$$

Fourthly, a rotating matrix (rotating matrix of the line segment FE) Mt of the band-like mark ME from $t=0$ to $t=1$ is determined with the following expression (8):

$$Mt = \begin{bmatrix} (Vx^2-1)\cdot(1-\cos\phi)+1 & Vx\cdot Vy\cdot(1-\cos\phi)-Vz\cdot\sin\phi & Vx\cdot Vz\cdot(1-\cos\phi)+Vy\cdot\sin\phi \\ Vx\cdot Vy\cdot(1-\cos\phi)+Vz\cdot\sin\phi & (Vy^2-1)\cdot(1-\cos\phi)+1 & Vy\cdot Vz\cdot(1-\cos\phi)-Vx\cdot\sin\phi \\ Vx\cdot Vz\cdot(1-\cos\phi)-Vy\cdot\sin\phi & Vy\cdot Vz\cdot(1-\cos\phi)+Vx\cdot\sin\phi & (Vz^2-1)\cdot(1-\cos\phi)+1 \end{bmatrix} \qquad (8)$$

Fifthly, the DC vector (DCx0, DCy0, DCz0) at $t=0$ and the BA vector (BAx0, BAy0, BAz0) of the BA vector are determined. Here, $$\overrightarrow{DC_{x0}} = C_{x0} - D_{x0}, \overrightarrow{DC_{y0}} = C_{y0} - D_{y0}, \overrightarrow{DC_{z0}} = C_{z0} - D_{z0},$$
$$\overrightarrow{BA_{x0}} = A_{x0} - B_{x0}, \overrightarrow{BA_{y0}} = A_{y0} - B_{y0}, \overrightarrow{BA_{z0}} = A_{z0} - B_{z0},$$

Each of the DC vector and the BA vector is multiplied by the rotating matrix Mt. As a result, the D'C' vector and the B'A' vector estimated at $t=1$ are determined. This is as shown with the following expression (9) and the expression (10):

$$\overrightarrow{B'A'} = Mt \cdot \overrightarrow{BA} \qquad (9)$$
$$\overrightarrow{D'C'} = Mt \cdot \overrightarrow{DC} \qquad (10)$$

By adding the B'A' vector to the position B' that could be obtained, the position A' (position of the mark MA at $t=1$) that has not been obtained is estimated. In addition, by adding the D'C' vector to the position D' that could be obtained, the position C' (position of the mark MC at $t=1$) that has not been obtained is estimated. Use of the estimated values enables the calculations after STEP 8 in FIG. 5A to be performed. Consequently, similar to the case in which the three or more positions can be extracted at both points in time $t=0$ and $t=1$, the behavior of the head 2 immediately before and at the impact can be estimated.

Figure 9:
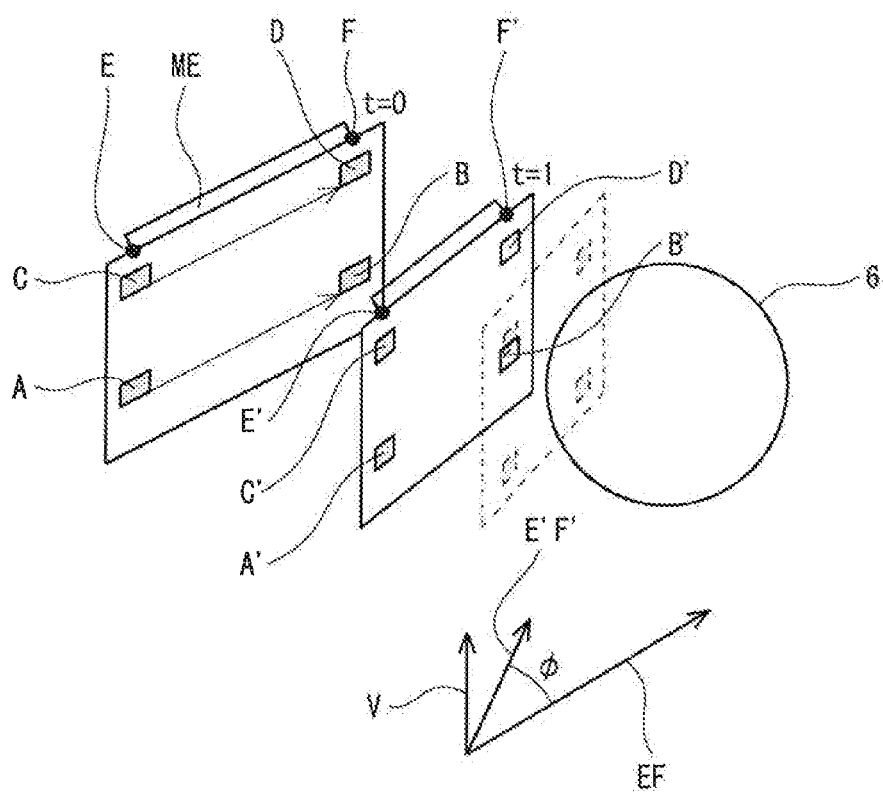
FIG. 9 is an illustrative view for estimating a position on the three dimensional coordinates of a heel-side mark which has not been photographed.
Figure 10:
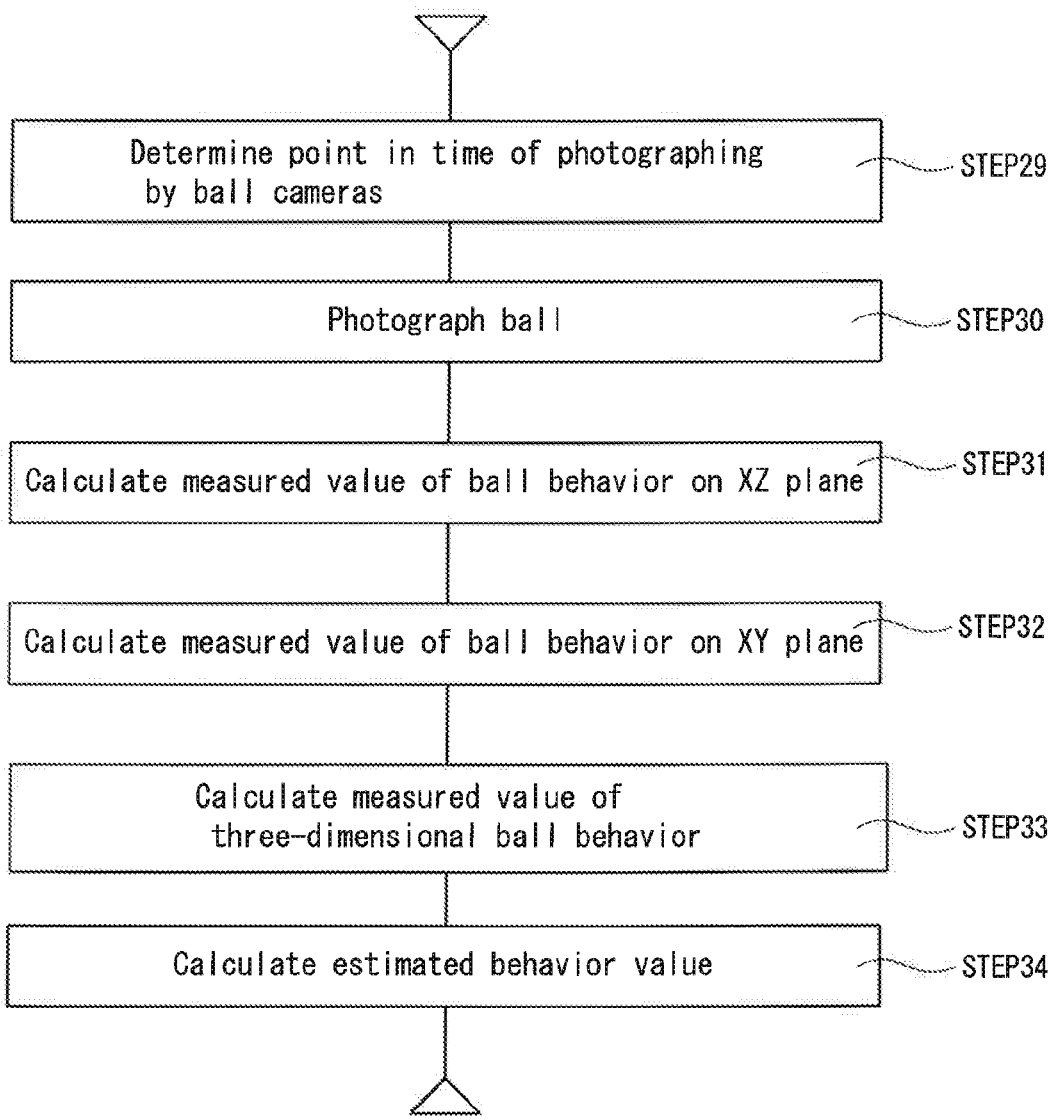
FIG. 10 is a flow chart showing a method for measuring behavior of a ball according to one embodiment of the present invention.

For the head 2W shown in FIG. 9, at $t=0$, the four mark positions, A, B, C, D are all extracted. At $t=1$, the two marks on the heel side are not photographed as they are hidden behind the ball 6, and the two positions B', D' are not extracted. Even in this case, in order to estimate the positions B', D' that have not been obtained, an approach similar to the approach described with reference to FIG. 8 is used. Although similar description is omitted, in the example shown in FIG. 9, orientation of the vector is inverse to that in FIG. 8. Specifically, by using the CD vector (CDx0, CDy0, CDz0) at $t=0$ and the AB vector (ABx0, ABy0, ABz0) at $t=0$, the C'D' vector (CDx1, CDy1, CDz1) and A'B' vector (ABx1, ABy1, ABz1) at $t=1$ can be determined. Then, the rotation angle from $t=0$ to $t=1$ of the vector EF at end positions of the band-like mark ME is used.

While the estimation of positions of marks which are not obtained at any point in time was described with the wood type golf club head 2W as an example, the estimation is similarly possible for the iron type golf club head 2A. For the head 2A of FIG. 4, if a position of one of the marks MA, MB, MC on the face surface 12A is not obtained at any point in time, the position can be estimated.

One example of a method for measuring behavior of the ball 6 will be described with reference to the flow chart of FIG. 10 and FIG. 11 to FIG. 14. Points in time $t=2$ and $t=3$ when the ball 6 is photographed by the three cameras of the fourth to the sixth cameras 3D, 3E and 3F are determined (STEP 29). For the points in time $t=2$ and $t=3$, predetermined time is set based on time when the optical sensors 8A and 8B sense the golf club 5 (head 2), for example.

The ball 6 immediately after being hit is photographed by the fourth camera 3D, the fifth camera 3E, and the sixth camera 3F (STEP 30). It is photographed at each of the two points in time, the points in time $t=2$ and $t=3$, for example. At the point in time $t=2$, the fourth camera 3D and the fifth camera 3E are synchronized and photograph. At the point in time $t=3$, the fourth camera 3D and the sixth camera 3F are synchronized and photograph.

From multiple pieces of photographed two-dimensional data, a measured value of behavior of the ball 6 on the XZ plane is determined (STEP 31). Specifically, amount of backspin, amount of sidespin, an initial-launch angle at the XZ plane, and a travel distance of the ball 6 on the XZ plane are shown. From multiple pieces of photographed two-dimensional data, a measured value of behavior of the ball 6 on the XY plane is determined (STEP 32). Specifically, a deflection angle and a travel distance are shown.

From the measured value of behavior of the ball 6 on the XZ plane and the measured value of behavior of the ball 6 on the XY plane, a measured value of behavior of the ball 6 on the third-dimensional coordinates can be determined (STEP 33). Specifically, an initial-launch angle and a ball speed are shown.

For the measured value of behavior of the ball 6, an estimated value of behavior of the ball 6 is calculated with a compensation formula stored in advance (STEP 34). The compensation formula has been determined in advance and stored in the computer 4.

The compensation formula is determined with the following expression (11), on the assumption that a measured value of behavior of the ball 6 is Mm and an estimated value thereof is Ms:

$$Ms = An \cdot Mm + Bn \qquad (11)$$

where the coefficient An is a correction factor. The segment Bn is a correction segment. The correction factor An and the correction segment Bn are determined from a relationship of an actually measured value Mr of behavior of the ball 6 and the measured value Mm thereof. The compensation formula is such defined that the estimated value Ms is approximate to the actually measured value Mr when the measured Mm is given.

Specifically, for example, positions of Pb1 and Pb2 can be arbitrarily defined. The ball 6 is supported on the positions of Pb1 and Pb2, for example, by using a jig. From a position and a posture of the ball 6, the actually measured value Mr of behavior of the ball 6 is determined. The ball 6 supported at the position of Pb1 is photographed by the fourth camera 3D and the fifth camera 3E. Similarly, the ball 6 supported at the position of Pb2 is photographed by the fourth camera 3D and the sixth camera 3F. With the photographing, the measured value Mm of behavior of the ball 6 is determined from the position and the posture of the ball 6.

With the point Pb1 and the point Pb2 changed, multiple actually measured values Mr of behavior of the ball 6 and measured values Mm corresponding to the actually measured values Mr are determined. A linear approximate expression is determined from a relationship of the actually measured values Mr and the measured values Mm. The linear approximate expression is the compensation formula described above.

Calculation of a behavior value of the ball 6 in the (STEP31) to (STEP34) will be described hereinafter with reference to FIG. 11 to FIG. 14. The description will be given with an initial-launch angle as an example of a behavior value of the ball 6.

Figure 11A:
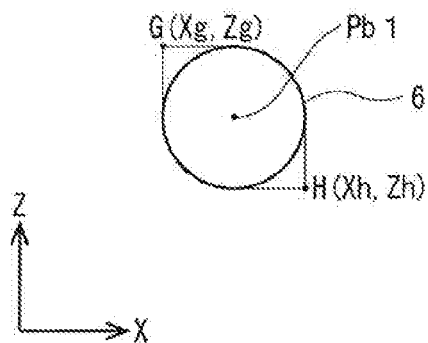
FIG. 11A and FIG. 11B are illustrative views of a method for measuring a ball position.
Figure 11B:
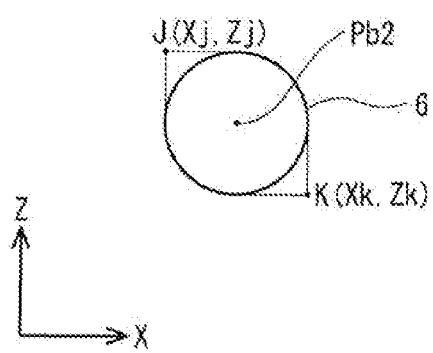

Firstly, a method for calculating a center position of the ball 6 will be described with reference to FIG. 11A and FIG. 11B. In the calculation method, a center position, a point Pb1 and a point Pb2 are calculated from a contour of the ball 6. FIG. 11A shows an image of two-dimensional data of the ball 6 at the point Pb1. FIG. 11B shows an image of two dimensional data of the ball 6 at the point Pb2.

A point G ($X_g$, $Z_g$) and a point H ($X_h$, $Z_h$) of FIG. 11A are intersection points of a tangent line of the ball 6 contour which is parallel to the X axis and a tangent line of the ball 6 contour which is parallel to the Z axis. The point G ($X_g$, $Z_g$) and the point H ($X_h$, $Z_h$) are symmetrically located, centering the point Pb1 ($X_{p1}$, $Z_{p1}$). The point Pb1 ($X_{p1}$, $Z_{p1}$) is determined from the point G ($X_g$, $Z_g$) and the point H ($X_h$, $Z_h$) with the following expression (12):

$$Xp1=(Xg+Xh)/2$$

$$Zp1=(Zg+Zh)/2 \tag{12}$$

Similar to the point G ($X_g$, $Z_g$) and the point H ($X_h$, $Z_h$), the point Pb2 ($X_{p2}$, $Z_{p2}$) is determined from a point J ($X_j$, $Z_j$) and a point K ($X_k$, $Z_k$) in FIG. 11B with the following expression (13):

$$Xp2=(Xj+Xk)/2$$

$$Zp2=(Zj+Zk)/2 \tag{13}$$

Figure 12A:
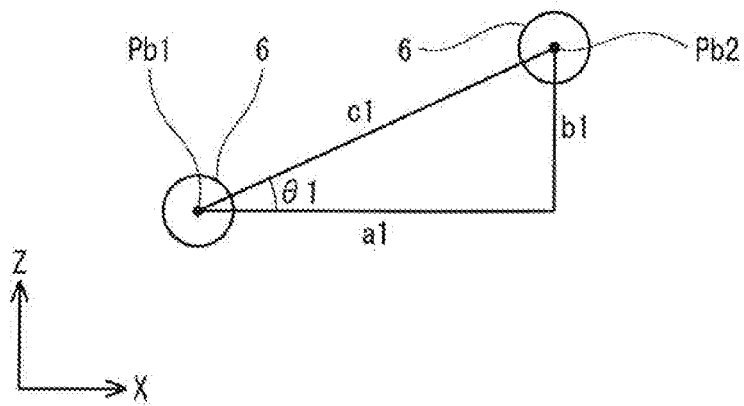
FIG. 12A and FIG. 12B are illustrative views of a method for measuring behavior of a ball with two-dimensional data.

FIG. 12A shows an image of two-dimensional data of the ball 6 positioned at the point Pb1 and the point Pb2 on the XZ plane. From the positional relationship of FIG. 12A, travel distances a1, b1, and c1 are calculated. An initial-launch angle θ1 on the XZ plane is calculated.

Figure 12B:
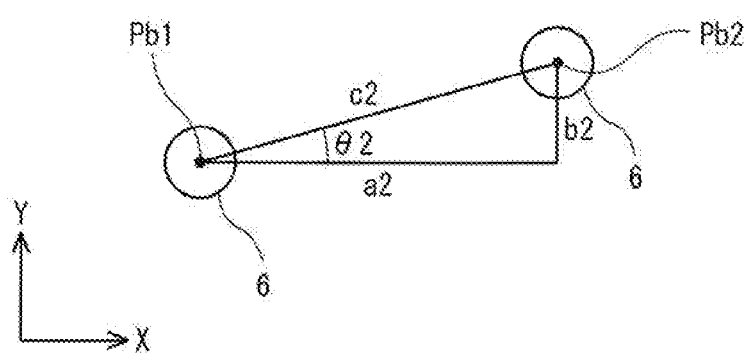

FIG. 12B shows an image of two dimensional data of the ball 6 positioned at the point Pb1 and the point Pb2 on the XY plane. From the positional relationship of FIG. 12B, travel distances a2, b2, and c2 are calculated. A deflection angle θ2 on the XY plane is calculated.

Figure 13:
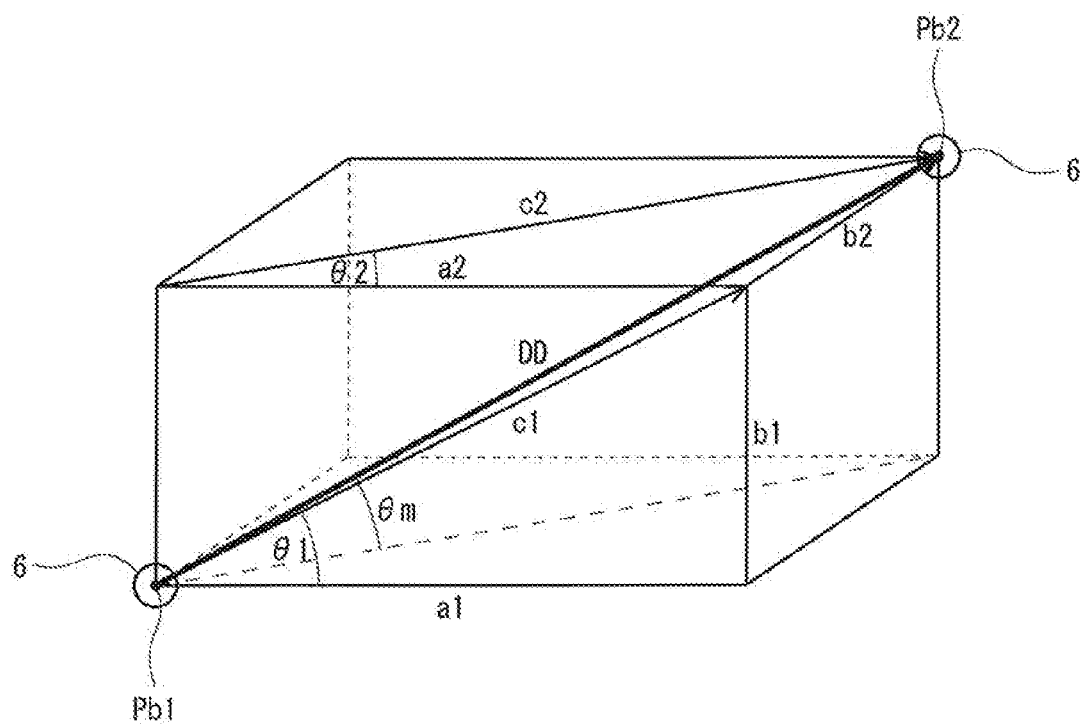
FIG. 13 is an illustrative view of a method for measuring behavior of a ball on three-dimensional coordinates.

FIG. 13 shows an image of the ball 6 positioned at the point Pb1 and the ball 6 positioned at the point Pb2 on the three-dimensional coordinates. The points Pb1 and the point Pb2 on the three-dimensional coordinates are obtained from the position on the XZ plane and the position on the XY plane.

The angle θm of FIG. 13 shows a measured value of an initial-launch angle of the ball 6. The measured initial-launch angle θm is determined from the angle θ1 and the measured deflection angle θ2 with the following expression (14). Note that a tan signifies an arc tangent.

$$\theta m = a\tan(\tan \theta 1 \cdot \cos \theta 2) \tag{14}$$

A compensation formula for an initial-launch angle is applied to the measured value θm of the initial-launch angle. An estimated value θs of the initial-launch angle is determined with the following expression (15):

$$\theta s = A1 \cdot \theta m + B1 \tag{15}$$

where A1 is a correction factor of the initial-launch angle and B1 is a correction segment of the initial-launch angle.

Next, a method for calculating a ball speed will be described. DD in FIG. 13 represents a travel distance from the point Pb1 to the point Pb2. The travel distance DD is determined from the (STEP 31), (STEP 32), and (STEP 33) with the following expression (16):

$$DD = c2/\cos \theta m \tag{16}$$

A time interval T2 between a photographing point in time t=2 of the point Pb1 and a photographing point in time t=3 of the point Pb2 is calculated. A measured value Vm of the ball speed is determined with the following expression (17):

$$Vm = DD/T2 \tag{17}$$

An estimated value Vs of the ball speed is determined from a measured value Vm of the ball speed with the following expression (18):

$$Vs = A2 \cdot Vm + B2 \tag{18}$$

Where A2 is a correction factor of the ball speed and B2 is a correction segment of the ball speed.

Next, a method for calculating a deflection angle will be described. As described earlier with reference to FIG. 12B, the deflection angle θ2 is determined. Here, a measured value θu of the deflection angle is determined as the deflection angle θ2. In the example, the measured value θu of the deflection angle is determined from two-dimensional data on the XY plane. The measured value θu is obtained in (STEP 32).

An estimated value θt of the deflection angle is determined from the measured value θu of the deflection angle with the following expression (19):

$$\theta t = A3 \cdot \theta u + B3 \tag{19}$$

where A3 is a correction factor of the deflection angle and B3 is a correction segment of the deflection angle.

Figure 14A:
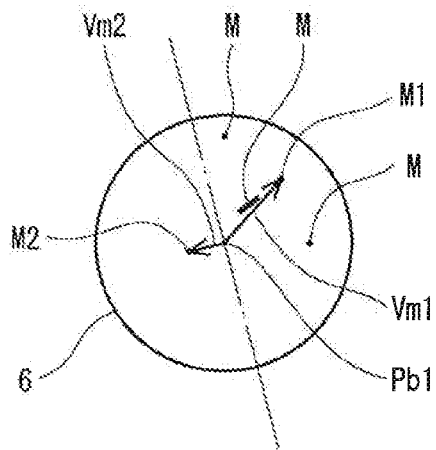
FIG. 14A and FIG. 14B are illustrative views of a method for measuring backspin and sidespin of a ball.
Figure 14B:
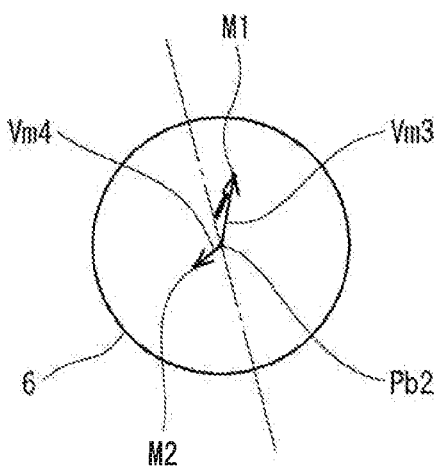

Next, a method for calculating backspin and sidespin will be described. FIG. 14A shows an image of two-dimensional data obtained from the fifth camera 3E. FIG. 14B shows an image of two-dimensional data obtained from the sixth camera 3F. In this example, a measured value Sbm of the backspin is determined from two-dimensional data of the XZ plane.

In the two-dimensional data of FIG. 14A, a center point Pb1 of the ball 6 is determined. Any two points (M1 and M2) are selected from marks on the ball surface. Similarly, in the two-dimensional data of FIG. 14B, a center point Pb2 of the ball 6 is determined. The two points (M1 and M2) of the marks identified by the image of FIG. 14A are identified.

An arrow Vm1 of FIG. 14A represents a vector from the point Pb1 to the point M1. An arrow Vm2 represents a vector from the point Pb1 to the point M2. An arrow Vm3 of FIG. 14B represents a vector from the point Pb2 to the point M1. An arrow Vm4 represents a vector from the point Pb2 to the point M2. A rotation angle ψ1 of the ball 6 is determined from the vectors Vm1 and Vm3. A rotation angle ψ2 of the ball 6 is determined from the vector Vm2 and the vector Vm4. A rotation angle ψm is determined as a mean of the rotation angle ψ1 and the rotation angle ψ2.

A rotation angle ψmb, which is a component of the YZ plane of the rotation angle ψm, is determined. The measured value Sbm of backspin is determined from the rotation angle ψmb and the time interval T2. An estimated value Sbt of backspin is determined from the measured value Sbm of backspin with the following expression (20):

$$Sbt = A4 \cdot Sbm + B4 \quad (20)$$

where A4 is a correction factor of backspin and B4 is a correction segment of backspin.

Similarly, a rotation angle ψbs, which is a component of the XY plane of the rotation angle ψm, is determined. The measured value Ss of sidespin is determined from the rotation angle ψbs and the time interval T2. An estimated value Sst of sidespin is determined from the measured value Ssm of sidespin with the following expression (21):

$$Sst = A5 \cdot Ssm + B5 \quad (21)$$

where A5 is a correction factor of sidespin and B5 is a correction segment of sidespin.

The estimated value of club behavior and the estimated value of ball behavior which have been calculated are stored in the computer 4. The computer 4 displays a predetermined estimated value on a monitor as its behavior value from the estimated value of club behavior and the estimated value of ball behavior. It may also display an image of a positional relationship of the face surface 12 and the ball 6 at the impact which has been determined from the estimated values. It may further combine this image with display image displays of the face surface 12 at the points in time t=0 and t=1.

In the measurement system 1, behavior of the ball 6 is stored corresponding to behavior of the golf club 5. If a ball speed, an initial-launch angle, a deflection angle, and values of backspin and sidespin are identified, a flight distance and a flying direction of the ball 6 can be calculated. This analyzer can calculate a flight distance and a flying direction of the ball 6 corresponding to behavior values of the golf club 5, such as a face angle, a head locus angle, right and left hit positions.

In the measurement system 1, positions of marks are estimated even when the marks immediately before hit are in positions hidden behind the ball 6 and cannot be photographed. In the measurement system 1, the face surface 12 can be photographed at a position where a part of the face surface 12 is hidden behind the ball 6. The face surface 12 at a position which is closer to the position at the impact can be photographed. As it measures based on data on a position closer to that at the impact, the measurement system 1 has excellent measurement precision.

In the measurement system 1, a position of the ball 6 is photographed by a combination of the fourth camera 3D and the fifth camera 3E, and by a combination of the fourth camera 3D and the sixth camera 3F. As a behavior value of the ball 6 is measured by a combination of the cameras optical axes of which intersect each other almost perpendicularly, each behavior value in three dimensions can be measured with precision.

In the measurement system 1, an estimated value Ms is determined by correcting the measured value Mm which is calculated from image data. With this, the system has excellent precision of behavior values to be determined from photographed image data. The measurement system 1 can determine behavior values of the golf club 5 and the ball 6 with precision.

The measurement system 1 can provide an estimated value of club behavior at the impact, as measurement result. It can provide as information for a golf player to easily understand. The measurement system 1 can provide more easily understandable analysis result, by providing in combination a behavior value of the golf club 5 and a behavior value of the ball 6, and a flight distance and a flying direction of the ball 6 together.

Fitting of the golf club 5 is performed based on the club behavior value and the ball behavior value, thereby fitting which is most suitable from the standpoint of a flight distance or a flying direction of the ball 6 is possible.

Figure 15:
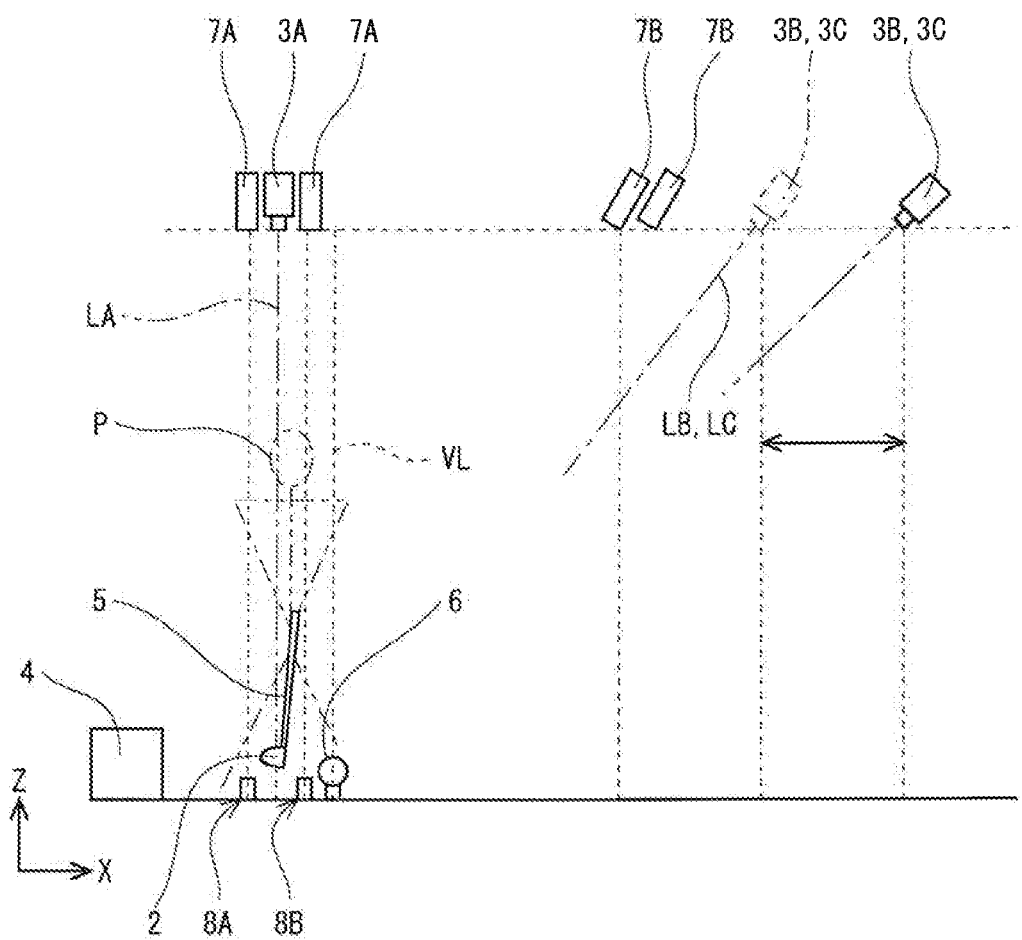
FIG. 15 is a schematic front view showing one embodiment of a measurement system for carrying out a method for measuring behavior of a club head according to the present invention.
Figure 16:
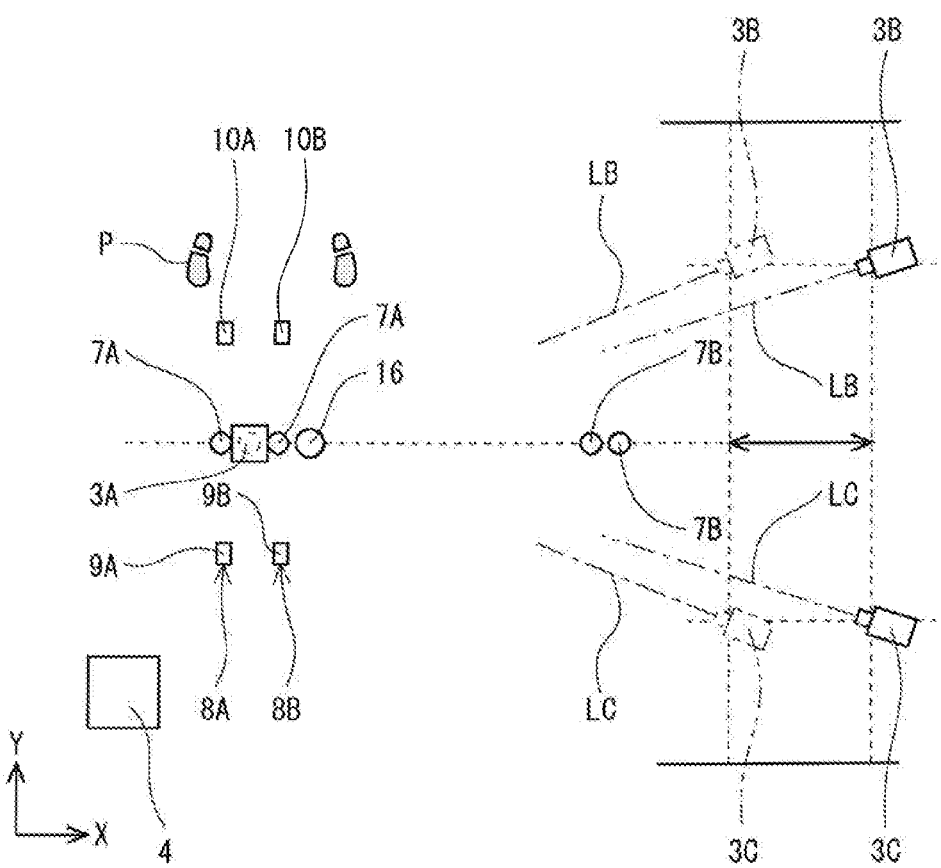
FIG. 16 is a plan view of FIG. 15.

FIG. 15 and FIG. 16 are views schematically showing one embodiment of a measurement system for performing a method for measuring behavior of a club head according to the present invention. The measurement system 21 differs from the system 1 shown in FIG. 1 and FIG. 2 in that it does not include ball cameras 3D, 3E, 3F. The measurement system 21 measures behavior of a golf club being swung by a golf player P. In the measurement, three-dimensional orthogonal coordinates of the golf club being swung are measured in a time series. Points on three or more locations on a head 2 of the golf club are measured on three-dimensional coordinates.

It is preferable that a method referred to as the DLT (Direct Linear Transformation) method is used to measure three-dimensional coordinates. The DLT method is described in Japanese Patent No. 2950450, Japanese Patent Application Publication No. 2004-344418 and the like, for example. The DLT method has also been commonly used in the field of biomechanics.

The DLT method is a method for obtaining three-dimensional coordinates by using multiple images viewed from different directions. Specifically, it is the method for obtaining one positional data of three-dimensional coordinate from all possible combinations of multiple positional data of two-dimensional coordinates of a target object from different directions. Needless to say, it is necessary that the multiple positional data of two-dimensional coordinates is data obtained at a same point in time (data photographed simultaneously). The DLT method has fewer limitations on arrangement of the cameras and is highly versatile. The DLT method has also an advantage that it can eliminate a need for information on camera constants such as positions of the cameras in an actual space, a direction of an optical axis, focal length of a lens. In the DLT method, three-dimensional coordinates are re-constructed based on known points in the three-dimensional coordinates, namely, images of points (control points) whose coordinate values in the actual space are known. To set a control point, in general, six or more marks, a positional relation of which is set quantitatively, are created or a reference frame (calibration frame) is used.

In measurement of behavior, marks are attached to predetermined locations of the club head 2. Position where marks are attached will be described later. Behavior of the marks is measured. In behavior analysis of the club head 2, analysis is performed based on measurement result of behavior of the marks. Three-dimensional coordinates of the marks are obtained by the DLT method described above.

An embodiment shown in FIG. 15 and FIG. 16 shows a system 21 for measuring three-dimensional behavior using the DLT method. The measurement system 21 includes multiple cameras 3, a computer 4, a golf club 5, and multiple marks M attached to the golf club 5. The cameras 3 are high-speed cameras capable of continuous photographing. In the measurement system 21, a front-back direction of a golf player P is a Y axis direction, a direction which is perpendicular and vertical to the Y axis direction is a Z axis direction, and a direction which is perpendicular to both Y and Z axes and is a ball hit direction (ball flight direction) is an X axis direction. An origin of the three-dimensional coordinates is set at a center point of a golf ball 6 (hereinafter simply referred to as a ball) which is placed on a fixed position. On the X axis, an orientation in which the ball 6 flies is positive. On the Y axis, the side on which the golf player P stands is positive. On the Z axis, the upper part is positive. On the three-dimensional coordinates, a position and a posture of the club head 2 are identified.

The multiple cameras 3 are connected to the computer 4. The computer 4 has a control unit not shown. The control unit synchronizes the multiple cameras 3 and controls them so that they can photograph. The computer 4 includes a storage unit in which an analysis program based on the DLT method is stored and a calculation unit. A typical storage unit is a hard disk. A typical calculation unit is a CPU.

The multiple cameras 3 are placed at mutually different positions. In the embodiment, three cameras are used. The three cameras 3 are synchronized and triggered. One camera (referred to as a first camera) 3A is placed at almost right above a ball set position so that it can photograph behavior of the club head immediately before impact and a top part of the club head 2. Other two cameras (referred to as a second camera and a third camera) 3B, 3C are placed in a flying ball direction so that they can photograph a face surface. Specifics are as follows. In addition, the number of the cameras 3 is not limited to three. Four or more cameras 3 may be used.

The first camera 3A is placed above a position which is slightly behind an X-axis origin (center of the ball 6). In this embodiment, it is placed at a position (X=−80 mm, Y=0, Z=4000 mm) which is 80 mm behind the origin and 4000 mm above the floor face. The first camera 3A is referred to as an upper camera 3A. The second camera 3B is placed at a position (X=4000 mm, Y=1250 mm, Z=4000 mm) which is 4000 mm above a position which is 4000 mm ahead the X-axis origin, and 1250 mm in a positive direction of the Y axis. The second camera 3B is referred to as a left camera 3B. The third camera 3C is placed at a position (X=4000 mm, Y=−1250 mm, Z=4000 mm) which is 4000 mm above each position which is 4000 mm ahead the X-axis origin, and 1250 mm in a negative direction of the Y axis. The third camera 3C is referred to as a right camera 3C. The second and the third cameras 3B, 3C are enabled to move within a range of 1000 mm to the X axis direction. Specifically, the two cameras 3B, 3C are enabled to adjust a position in a range of 3000 to 4000 mm from the origin. The above-mentioned dimensions are examples and are not limited thereto.

The second and the third cameras 3B, 3C are such arranged that optimal axes thereof are orthogonal to each other, thereby precision of a solution to be obtained by the numerical solution of the DLT method is higher. However, as a crossed axes angle of both optical axes increases, an angle to be formed by a face surface of a club head which is a target of photographing and the optical axes is smaller. Thus, images of multiple marks come closer, and become difficult to be identified. In contrast, when the crossed axes angle of both optical axes decreases, the precision to be obtained by the numerical solution of the DLT method is lower.

From the standpoint of the precision of numerical analysis explained above, it is preferable that positions to place the cameras 3 are determined as follows. For the first camera 3A, its optical axis LA forms an angle of 80° or larger and 100° or smaller to a vertical line passing through the center of the ball 6. The second and the third cameras 3B, 3C are respectively installed so that directions of their optical axes LB, LC form an angle of 30° or larger and 60° or smaller from a set position of the ball 6 to the ground (floor face). In addition, the second camera 3B is placed with a direction of its optical axis LB forming an angle of 0° or larger and 35° or smaller (in the positive direction of the Y axis) to the X axis in planar view. The third camera 3C is placed with a direction of its optical axis LC forming an angle of −35° or larger and 0° or smaller to the X axis in planar view. However, an angle to be formed by the optical axis LB of the second camera 3B and the optical axis LC of the third camera 3C is set to be 20° or larger and 90° or smaller in planar view.

Sandwiching the first camera 3A in the X axis direction, first strobes 7A are mounted ahead and behind it. The first strobes 7A are mounted, at positions of Y=0 and Z=4000 mm, with X being −30 mm and X=−130 mm. In addition, two second strobes 7B are mounted at positions of X=2000 mm, Y=0, and Z=4000 mm. The first strobes 7A irradiate downward and in an almost vertical direction. Second strobes 7B irradiate the vicinity of the ball 6. The strobes 7 irradiate synchronously with activation of the cameras 3. From the standpoint of effective illumination, the second strobes 7B are placed, forming an angle of 40° or larger and 80° or smaller to the ground (floor face) from the set position of the ball 6.

A trigger device which determines timing of when to activate the three cameras 3A, 3B, 3C and the strobes 7A and 7B is placed behind the ball 6. The trigger device is comprised of two optical sensors 8A, 8B. The optical sensors 8A, 8B have sensed light irradiators 9A, 9B which are placed opposed, sandwiching the X axis which is a travel path of the club head 2 and light receivers 10A, 10B which can receive sensed light. The first optical sensor 8A is located at a position of X=−130 mm, and the second optical sensor 8B is located at a position of X=−30 mm. When the head 2 of the swung golf club 5 shields sensed light, the light receiver 10A, 10B sense this. With shielding and sensing by respective light receivers 10A, 10B, each sensing point in time is a reference point in time. Based on the reference point in time, the strobes 7 and the cameras 3 operate.

FIG. 3 and FIG. 4 show a position in the club head 2 where marks M are formed. FIG. 3 shows a club head 2W of a wood type golf club. FIG. 3A is a plan view of the club head 2W and FIG. 3B is a front view of the club head 2W. Four marks MA, MB, MC, MD are formed on a face surface 12W. As these marks, reflection marks all of which are of a prism type are adopted. A face center Fo, which is a midpoint of the face surface, is set on the face surface 12W. A vertical imaginary line passing through the face center Fo and extending over the face surface 12W in up and down directions is made a Yw axis. A horizontal imaginary line passing through the face center Fo perpendicular to the Yw axis, and extending to the toe-heel direction on the face surface 12W is made an Xw axis. The four marks MA, MB, MC, MD are located at four vertices of a rectangle on the face surface 12W. Two sides AC, BD are parallel to the Yw axis, and other two sides AB, CD are parallel to the Xw axis. An intersection point of the imaginary line AD and the imaginary line BC is the face center Fo.

The face center Fo can be set at any position which seems to be reasonable to obtain positional data to be described hereinafter. Firstly, the face center can be identified from width and height of the face surface. Secondly, a centroid of area of the face surface can be set as the face center. Thirdly, the face center can be identified from a positional relationship of the position of the center of gravity of the entire club head and the face surface. As an example, a method for setting the face center from the width and the height of the face surface will be described hereinafter. First, the club head is placed on a horizontal surface so as to have a predetermined real loft angle (the face angle being 0) and a lie angle. Specifically, the golf club is fixed to the posture mentioned above. A most toe-side point on the face surface (face most toe-side point) of the club head in this posture is identified, and a most heel-side point (face most heel-side point) is identified. A horizontally spaced distance of the face most toe-side point and the face most heel-side point is identified as face width. A surface (perpendicular surface) passing through a center point of the face width, and being perpendicular to the horizontal surface and perpendicular to the face surface at the center point is identified. A line (vertical line) of intersection on the face surface of the perpendicular surface and the face surface is identified. An uppermost point (face uppermost point) of the vertical line on the face surface is identified. Then, a lowermost point (face lowermost point) of the vertical line on the face surface is identified. A center point of an imaginary line connecting the face uppermost point and the face lowermost point is set as face center. A method for setting the face center is an example.

For the wood type club head 2W, a band-like mark ME is formed on a top (top part) 13W of a crown portion thereof. As shown in FIG. 3A, the top part 13W is a member adjacent to the face surface 12W on a top surface of the crown portion. The band-like mark ME extends over the top portion 13W in the toe-heel direction. As described later, when only two marks of those on the face surface 12W are photographed, the band-like mark ME is used to estimate a position of a mark which has not been photographed. The band-like mark ME can be easily photographed by the first camera 3A described above.

FIG. 4 shows a head 2A of an iron type club, called sand-wedge, having a large loft angle. FIG. 4A is a plan view of the head 2A, and FIG. 4B is a front view of the head 2A. Three marks MA, MB, MC are formed on the face surface 12A. For the marks, a reflective tape which is a tape of glass beads is used as a reflection mark. For a golf club whose loft angle is small, it is preferable to use a reflection mark of a prism type, as light reflected by the reflection mark is not easily photographed. In contrast, for a golf club whose loft angle is large, there is no need to use a reflection mark of a prism type, in particular, as light reflected by the reflection mark is easily photographed. Hence, for the golf club whose loft angle is large, it is preferable to use a reflective tape of a glass bead type which is lower-cost, and the like. Specifically, a reflection mark of a prism type is preferable for a golf club whose loft angle is 25° or smaller. It is more preferable for a club whose loft angle is 20° or smaller. It is particularly preferable for a club whose loft angle is 15° or smaller. On the one hand, from the standpoint of cost reduction, a reflective tape of a glass bead type and the like is preferable for a club whose loft angle is 16° or larger. It is more preferable for a club whose loft angle is 21° or more. It is particularly preferable for a club whose loft angle is 26° or larger. All of the marks MA, MB, MC are formed at a blasted part on the center side of the face surface 12A. This is because at both ends in the toe-heel direction, identification of marks is likely to be difficult, as the face surface 12A itself easily reflects.

The face center Fo is set on the face surface 12A. Similar to the above wood type club head 2W, an Xa axis which is a horizontal imaginary line and a Ya axis which is a vertical imaginary line are set. The three marks MA, MB, MC are located at three vertices A, B, C of a rectangular triangle on the face surface 12A. The base AB matches the Xa axis. The face center Fo is a midpoint of the base AB. The side AC is parallel to the Ya axis. The face center Fo of the head 2A of an iron type club can also be set with various types of setting methods described above. In addition, it can be set with the following method. First, postures of target clubs are fixed so that each club will have a predefined lie angle. An across-the-width center point of a face material of the face surface (an area surrounded by a straight line passing through A and C in FIG. 4B and a line (line AC) passing through B and being parallel to the line AC, for example) is identified, and a vertical line (vertical centerline) passing through the center point is identified. An uppermost point (face uppermost point) of the vertical centerline on the face material is identified. Next, a lowermost point (face lowermost point) of the vertical centerline on the face material is identified. A center point of an imaginary line connecting the face uppermost point and the face lowermost point is set as a face center. The method for setting a face center is one example.

For the iron type head 2A, two marks MF, MG are formed on a top part 13A of the crown portion thereof. As shown in FIG. 4A, the top part 13A is a member on the top surface of the crown portion and adjacent to the face surface 12A. The two marks MF, MG formed on the top part 13A are spaced to each other in the toe-heel direction. As described later, when only two marks of those on the face surface 12A are photographed, the two marks MF, MG are used to estimate a position of a mark which is not photographed. For this purpose, an imaginary line connecting the two marks MF, MG is used. The two marks MF, MG can be easily photographed by the first camera 3A described above.

Although four marks are formed on a face surface 12 of a wood type head 2W in the embodiment, the number of marks is not limited to four. It may be three, or five or more. Although the three marks are formed on the face surface 12 of the iron type head 2A, the number of marks is not limited to three, and may be four or more. Marks on the face surface are needed at least at three positions which can constitute a face. Specifically, at least three marks which are not aligned are needed. This is because the face surface of the head 2 needs to be identified.

Positions of the marks MA, MB, MC, MD are not limited to those in the above embodiment. It is preferable that any one (first mark) of the marks on the face surface 12 is arranged on the toe side of the Ya axis and the Yw axis (hereinafter represented by the Ya axis), any one (second mark) of the other marks is arranged on the heel side of the Ya axis, any one (third mark) of the other marks is further arranged above or below any one mark (referred to as a reference mark) of the first and the second marks, and an imaginary line connecting the reference mark with the third mark and an imaginary line connecting the first mark with the second mark form an angle of 85° of larger and 95° or smaller. The most preferable angle is 90°. In the embodiment, the mark MA in FIG. 3B and FIG. 4B corresponds to the reference mark. It is further preferable that such first, second, and third marks meet at least one requirement of the following (a) to (e):

(a) The reference mark is preferably arranged on the toe side of the Ya side. This is because, in general, the face surface is wider on the toe side than on the heel side, and thus multiple marks can be widely distributed and arranged. Consequently, a situation in which adjacent marks are both hidden behind the ball can be avoided.

(b) The first mark and the second mark are preferably arranged so that the imaginary line connecting them is bisected by the Ya axis. This is because the face center Fo can be easily calculated. Furthermore, it is because a situation in which the marks are hidden behind the ball when the ball collides with vicinity of the face surface center can be avoided.

(c) The first mark and the second mark are preferably arranged so that the imaginary line connecting them are orthogonal to the Ya axis. This is because a "hit point" can be defined by a distance in each up, down, right, and left direction from the face center Fo when three-dimensional coordinates are converted into two-dimensional coordinates. Consequently, it is easier to imagine which position of the face surface the ball collides with.

(d) A spaced distance between the first mark and the second mark (actual length of the imaginary line connecting both marks. This also applies hereinafter) is preferably 40 mm or more, and more preferably 45 mm or more. This is because a situation in which adjacent marks are both hidden behind the ball can be avoided. The spaced distance can be set in the range of size of the face surface, and usually can be set to 80 mm or less, and furthermore to 70 mm or less. In the embodiment, the spaced distance is set to 60 mm for both the wood type club head 2W and the iron type club head 2A.

(e) A spaced distance between the reference mark and the third mark is preferably 22 mm or more, and more preferably 24 mm or more. This is because a situation in which adjacent marks are both hidden behind the ball can be avoided. The spaced distance can be set in the range of size of the face surface, and usually can be set to 50 mm or less, and furthermore to 40 mm or less. In the embodiment, the spaced distance is set to 30 mm for the wood type club head 2W and 25 mm for the iron type club head 2A.

With the measurement system 21 described above, three-dimensional data such as a position and a posture of the club head 2 is obtained in a time series by using the DLT method. Based on the three-dimensional data obtained, a positional relationship of the face surface 12 and the ball 6 on the three-dimensional coordinates is updated in a time series, and a point in time of contact (impact time) of the face surface with the ball is identified. Finally, behavior of the club head 2 at the impact is estimated. The behavior is, for example, a moving loft angle, a face angle (angular aperture), a blow angle, and an angle of approach of the club head 2, a hit point of the ball 6 on the face surface 12 and the like.

One example of estimation of behavior of the club head 2 at the impact will be described with reference to FIG. 5A, FIG. 5B, FIG. 6 to FIG. 9, and FIG. 17 to FIG. 20. In FIG. 5A, the club head immediately before the impact is simultaneously photographed by the three cameras of the first to the third cameras 3A, 3B, 3C described above (STEP 1). The photographing takes place at each of two points in time, for example. Then, positions of multiple marks on the face surface 12 are extracted from photographed images by image processing (STEP 2). The multiple marks mentioned above mean four marks for a wood type club head and three marks for an iron type club head. However, three marks may be alternatively used for the wood type club head.

When a position of each mark is extracted in every photographed image of the three cameras (STEP 3), each position is converted into three-dimensional coordinates by a compensation formula (approximate formula to be provided by the DLT method) for measurement of the three cameras (STEP 4). When a position of each mark is extracted in photographed images of only two cameras of the three cameras (STEP 5), each position is converted into three-dimensional coordinates for a compensation formula (approximate formula to be provided by the DLT method) for measurement of the two cameras (STEP 6). Alternatively, when only two cameras of the second and the third cameras, for example, are used (STEP 5), each position is converted into three-dimensional coordinates by a compensation formula (to be provided by the DLT method) for measurement of the two cameras (STEP 6).

The compensation formula to be provided by the DLT method is stored in the computer 4. The compensation formula for measurement of the three cameras has been determined in advance based on images of control points photographed by the first camera 3A, the second camera 3B, and the third camera 3C. The compensation formula for measurement of the two cameras of the first camera 3A and the second camera 3B has been determined in advance based on images of the control points photographed by the first camera 3A and the second camera 3B. The compensation formula for measurement of the two cameras of the first camera 3A and the third camera 3C has been determined in advance based on images of the control points photographed by the first camera 3A and the third camera 3C. The compensation formula for measurement of the two cameras of the second camera 3B and the third camera 3C has been determined in advance based on images of the control points photographed by the second camera 3B and the third camera 3C. As the conversion from two-dimensional coordinates into three-dimensional coordinates of the (STEP 1) to (STEP 6) is performed by the publicly known DLT method, a detailed description will be omitted.

It is judged whether three-dimensional position information of three or more marks on the face surface at each of two points in time could be obtained (STEP 7). When the three-dimensional position information of three or more marks could be obtained, a position of the face surface 12 at the impact is estimated from positions of the face surface at two points in time, as described hereinafter, and a position of a contact point of the face surface 12 and the ball 6 on the three-dimensional coordinates is calculated (STEP 8). In the (STEP 8), time of a contact of the face surface 12 with the ball 6 is identified and a contact point is estimated, by updating in a time series a positional relationship of the face surface 12 and the ball 6 on the three-dimensional coordinates.

When only position information of a smaller number of marks than that obtained at one of the two points in time could be obtained at the other one of the two points in time (STEP 9) although the three-dimensional position information of the three or more marks could be obtained at any one of the two points in time, as shown in FIG. 5B, a position of the mark on the three-dimensional coordinates which could not be obtained on the other one time in point is estimated (STEP 10). More specifically, this is the case in which for four marks M formed on the face surface 12W of the wood type club head 2W, although three-dimensional position information of the four marks M could be initially obtained, two marks were not photographed as they were hidden behind the ball 6 at a later point in time, and thus three-dimensional position information thereof could not be obtained (STEP 9). In this case, the three-dimensional position information of the two marks which could not be obtained at the later point in time is estimated based on a rotation angle of the band-like mark ME on the top part 13W between the two points in time (STEP 10). The method for estimation will be described later. A position of the face surface 12 at the impact is estimated from positions of the face surface 12 at the two points in time, and a position of a contact point of the face surface 12 and the ball 6 on the three-dimensional coordinates is calculated (STEP 8).

The three-dimensional coordinates of the calculated contact point of the face surface 12 and the ball 6 are converted into coordinates of the face surface which are two-dimensional coordinates, and behavior of the club head including a hit point at the impact is estimated (STEP 11). A behavior value of the club head including a hit point at the impact is output (STEP 12).

[Estimation of Contact Point of Face Surface and Ball]

With reference to FIG. 6 and FIG. 7, calculation of a position of a contact point of the face surface 12 and the ball 6 on the three-dimensional coordinates in the (STEP 8) above will be described hereinafter. As shown in FIG. 6, marks are formed at three locations A, B, C on the face surface of the club head as shown. The basic idea of calculation of a position of the contact point on the three-dimensional coordinates is to determine a point in time when the ball comes in contact with a face comprised of the three points A, B, C on the assumption that the three points A, B, C are in a state of linear uniform motion, and to determine each coordinate of the above positions A, B, C and of the contact point Q at that point in time.

An early point in time of the two points in time mentioned above is made t=0, and a later point in time is made t=1. As shown, coordinate positions of the points A, B, C at the point in time t are set as A(t), B(t), C(t). The coordinate positions of the points A, B, C at the point in time t=0 are A(0), B(0), C(0). The coordinate positions of the points A, B, C at the point in time t=1 are A(1), B(1), C(1). The origin (0, 0, 0) of the three-dimensional coordinates mentioned above is the center point of the ball 6 shown in FIG. 6. A time interval between t=0 and t=1 is T. The time T is a measured value of a light shielding time interval. The light shielding time interval is an interval of time from when the club head 2 shields sensed light of the first optical sensor 8A as shown in FIG. 16 till time when it shields sensed light of the second optical sensor 8B. With the above, the coordinate positions A (t), B (t), C(t) are represented by the expression (1) described previously.

In the expression (1), δt is a calculation time interval. An initial value of δt is set to 100 μs (microseconds) and an end value to 300 μs, for example, and an increment step is set to 1 μs, for example. A radius of the ball is set to r, for example.

In the flow chart of FIG. 7, the coordinate positions A(t), B(t), C(t) are calculated with the above expression (1) (STEP 21). An AB vector and an AC vector at the time t are calculated. Then, an outer product N (Nx, Ny, Nz) of both vectors above is calculated (STEP 22). The outer product N of the vectors is a normal vector. The normal vector is a unit vector. The normal vector is a vector (face surface vector) perpendicular to the face surface.

By using the A (t), B(t), C(t) above and the normal vector N, a shortest distance rr between the center (0,0,0) of the ball and the face surface is calculated with the expression (2) described previously (STEP 23).

It is judged whether the shortest distance rr is equal to or smaller than the radius r of the ball (STEP 24). When it is equal to or smaller than the radius r, it is determined that δt at that point in time is δt at the impact, and the coordinate positions A(t), B(t), C(t) at the impact are determined (STEP 25). Then, the hit point (Qx, Qy, Qz) on the three-dimensional coordinates at the impact is determined with the expression (3) described previously (STEP 26).

In the (STEP 24) above, while the shortest distance rr is not equal to or smaller than the radius r of the ball, and while accumulated δt is not 300 μs, δt is replaced by δt+1 μs (STEP 28), and the above (STEP 21) to (STEP 24) are repeated. The hit point (Qx, Qy Qz) determined with the above calculations is the position on the three-dimensional coordinates. Therefore, the hit point needs to be converted into two-dimensional coordinates of the face surface, in accordance with (STEP 11) in FIG. 5B. The conversion of the hit point on the three-dimensional coordinates into the two dimensional coordinates will be described hereinafter, separately for a case of the iron type club head 2A and a case of the wood type club head 2W with reference to FIG. 17 and FIG. 18.

[Two-dimensional Conversion of Hit Point of Iron Type Club Head 2A]

Figure 17:
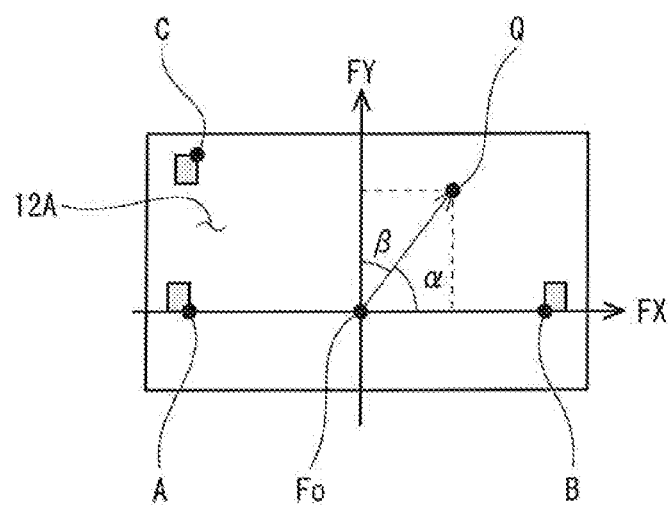
FIG. 17 is a view showing hit points of golf balls on a face surface of an iron type club head in two-dimensional coordinates.

The positions A, B, C of the three marks at the impact are respectively (Xa, Ya, Za), (Xb, Yb, Zb), (Xc, Yc, Zc), and the hit point is (Xq, Yq, Zq). This hit point (Xq, Yq, Zq) is a same position as the hit point (Qx, Qy, Qz) described above. As described above, the mark position of the face surface 12A for the iron type is such defined that the midpoint between A and B is the face center Fo (FIG. 4, FIG. 17). FIG. 17 shows two-dimensional orthogonal coordinates, composed of an FX axis and an FY axis, on the face surface 12A. The three-dimensional coordinate positions of the face center Fo and the point B are known, and the three-dimensional coordinate position of the hit point Q is also known. Based on this, size of an FoQ vector |FoQ vector| and FoB vector |FoB vector|, and an angle α formed by the FoQ vector and the FoB vector (FIG. 17) can be determined with the following expression (22), expression (23) and expression (24). Note that sqrt signifies a square root in ( ). In addition, the arrow → is attached to a top of the vectors shown in a mathematical expression to show that they are vectors.

$$|\overrightarrow{FoB}| = sqrt((Qx - (Xa + Xb)/2)^2 + \\ (Qy - (Ya + Yb)/2)^2 + (Qz - (Za + Zb)/2)^2) \quad (22)$$

$$|\overrightarrow{FoB}| = sqrt((Xb - (Xa + Xb)/2)^2 + \\ (Yb - (Ya + Yb)/2)^2 + (Zb - (Za + Zb)/2)^2) \quad (23)$$

$$\cos\alpha = \overrightarrow{FoQ} \cdot \overrightarrow{FoB} / |\overrightarrow{FoB}| \cdot |\overrightarrow{FoQ}| \quad (24)$$

A position of the hit point Q on the FX axis (axis X on the face surface) is determined with |FoQ vector|·cos α. An angle β formed by the FY axis (axis Y on the face surface) and the FoQ vector is 90°−α, and thus the position of the hit point Q on the FY axis is determined with |FoQ vector|·cos β. As such, the conversion of the hit point Q into the two-dimensional coordinates in (STEP 11) in FIG. 5B is easy.

[Two-dimensional Conversion of Hit Point of Wood Type Club Head 2W]

Figure 18:
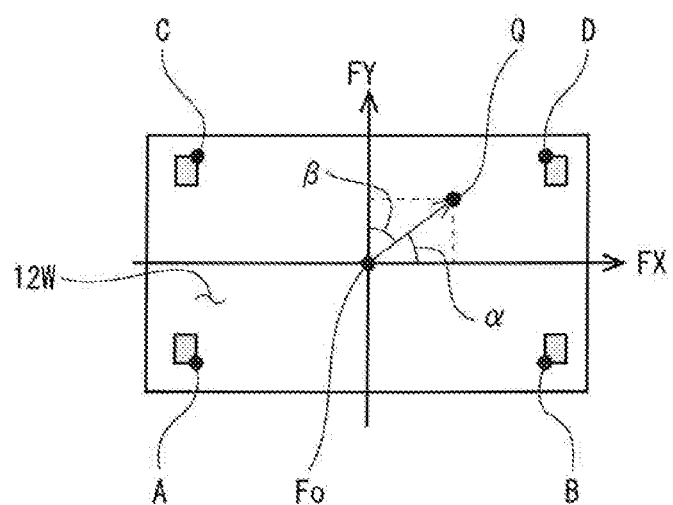
FIG. 18 is a view showing hit points of golf balls on a face surface of a wood type club head in two-dimensional coordinates.

FIG. 18 shows two-dimensional orthogonal coordinates, composed of an FX axis and an FY axis, on the face surface 12W. Positions A, B, C, D of four marks at impact are respectively represented as (Xa, Ya, Za), (Xb, Yb, Zb), (Xc, Yc, Zc), (Xd, Yd, Zd) and a hit point is represented as (Xq, Yq, Zq). This hit point (Xq, Yq, Zq) is a same position as the hit point (Qx, Qy, Qz) described above. As described above, the mark positions for the wood type face surface 12W are defined so that a midpoint of a rectangle ABCD is the face center Fo (FIG. 3, FIG. 18). As each point A, B, C, D is known, the coordinate positions (Fox, Foy, Foz) of the face center Fo can be determined with the following expression (25):

$$Fox=((Xa+Xb)/2+(Xc+Xd)/2)/2$$

$$Foy=((Ya+Yb)/2+(Yc+Yd)/2)/2$$

$$Foz=((Za+Zb)/2+(Zc+Zd)/2)/2 \quad (25)$$

With respective values mentioned above, size of an FoQ vector |FoQ vector| and FoB vector |FoB vector|, and an angle α formed by the FoQ vector and the FoB vector (FIG. 18) can be determined with the following expression (26), expression (27) and expression (28).

$$|\overrightarrow{FoB}| = sqrt((Qx - Fox)^2 + (Qy - Foy)^2 + (Qz - Foz)^2) \quad (26)$$

$$|\overrightarrow{FoB}| = sqrt((Xb + Xd)/2 - Fox)^2 + \quad (27)$$
$$((Yb + Yd)/2 - Foy)^2 +$$
$$((Zb + Zd)/2 - Foz)^2)$$

$$\cos\alpha = |\overrightarrow{FoQ} - \overrightarrow{FoB}|/|\overrightarrow{FoB}| \cdot |\overrightarrow{FoQ}| \quad (28)$$

A position of the hit point Q on an FX axis is determined by |FoQ vector|·cos α. An angle β formed by the FY axis and the FoQ vector in FIG. 18 is 90°−α, and thus the position of the hit point Q on the FY axis is determined with |FoQ vector|·cos β. As such, the conversion of the hit point Q into the two-dimensional coordinates in (STEP 11) in FIG. 5B is easy.

[Estimating of Moving Loft Angle]

Figure 19:
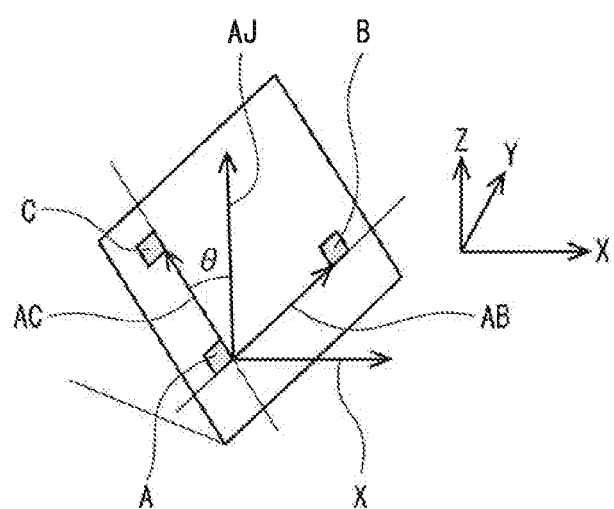
FIG. 19 is a view illustrating calculation of a moving loft angle of a club head.

Estimation of a moving loft angle θ immediately before and at impact will be described hereinafter with reference to FIG. 19. FIG. 19 shows two dimensional coordinates and three-dimensional coordinates set on a face surface. A moving loft angle is a loft angle which varies depending on movement of a club head due to swings, and the like. Here, as shown in FIG. 19, the moving loft angle θ is an angle θ formed by an outer product AJ of an X axis and an AB vector, and an AC vector. Thus, an AJ vector is a reference axis of the moving loft angle θ. Here, an AB vector=(Xb−Xa, Yb−Ya, Zb−Za), an AC vector=(Xc−Xa, Yc−Ya, Zc−Za), and an X axis vector=(1,0,0). The AJ vector is calculated by determining an outer product of the AB vector and the X axis vector. Then, the moving loft angle θ is determined with the following expression (29):

$$\cos\theta = \frac{\overrightarrow{AC} \cdot \overrightarrow{AJ}}{|\overrightarrow{AC}| \cdot |\overrightarrow{AJ}|} \quad (29)$$

When Xc<Xa, the moving loft angle θ is positive.

[Estimation of Face Angle]

Figure 20:
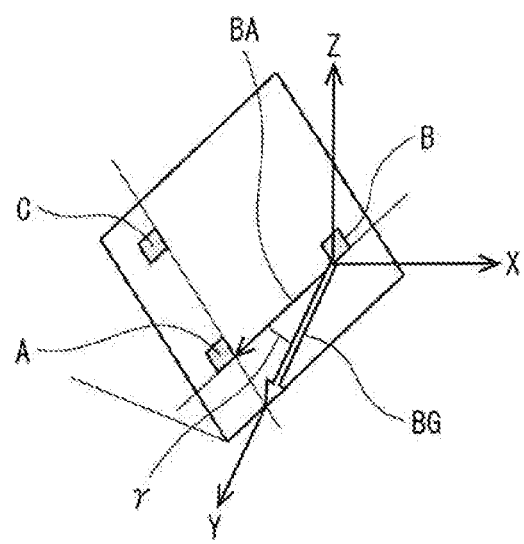
FIG. 20 is a view illustrating calculation of a face angle of a club head.

Estimation of a face angle (angular aperture) γ immediately before and at impact will be described hereinafter with reference to FIG. 20. FIG. 20 shows together two-dimensional coordinates and three-dimensional coordinates set on a face angle. Here, the face angle γ is an angle γ formed by a vector BG projected onto an YZ plane of a BA vector and the BA vector. Here, the BA vector=(Xa−Xb, Ya−Yb, Za−Zb). The vector BG projected onto a YZ plane of the BA vector=(0.0, Ya−Yb, Za−Zb). Then, the face angle γ is determined with the following expression (30):

$$\cos\gamma = \frac{\overrightarrow{BA} \cdot \overrightarrow{BG}}{|\overrightarrow{BG}| \cdot |\overrightarrow{BA}|} \quad (30)$$

When Xa<Xb, the face angle γ is positive, so-called open. Otherwise, the face angle γ is negative, so-called closed. With an approach similar to the method for estimating a face angle described above, a moving lie angle can also be estimated. When estimating a moving lie angle, it is not the YZ plane but a XY plane onto which the BA vector is projected, and the moving lie angle is determined with an angle formed by a vector projected onto the XY plane of the BA vector and the BA vector, and a predetermined lie angle of the club.

[Estimation of Blow Angle]

Next, estimation of a blow angle q immediately before and at impact will be described hereinafter. Here, a blow angle η is an angle η formed by vector Fot0'−Fot1' projected onto the XY plane of vector Fot0−Fot1 of the face center at t=0 and t=1 mentioned above, and the face center vector Fot0−Fot1. First, a travel distance of the face center at t=0 and t=1 is determined. Coordinates of the face center Fo are ((Xa+Xb)/2, (Ya+Yb)/2, (Za+Zb)/2). The travel distance of the face center is determined with the coordinates of Fo at t=0 and the coordinates of Fo at t=1. The face center vector Fot0−Fot1 is represented by the following expression (31). The vector Fot0'−Fot1' projected onto the XY plane of the face center vector is represented by the following expression (32). Thus, the blow angle η is determined with the following expression (33):

$$\overrightarrow{Fot0} - \overrightarrow{Fot1} = ((Xa1 + Xb1)/2 - (Xa0 + Xb0)/2, \quad (31)$$
$$(Ya1 + Yb1)/2 - (Ya0 + Yb0)/2,$$
$$(Za1 + Zb1)/2 - (Za0 + Zb0)/2,)$$

$$\overrightarrow{Fot0'} - \overrightarrow{Fot1'} = ((Xa1 + Xb1)/2 - (Xa0 + Xb0)/2, \quad (32)$$
$$(Ya1 + Yb1)/2 - (Ya0 + Yb0)/2,$$
$$0)$$

$$\cos\eta = (\overrightarrow{Fot0} - \overrightarrow{Fot1}) \cdot (\overrightarrow{Fot0'} - \overrightarrow{Fot1'}) / \quad (33)$$
$$|\overrightarrow{Fot0} - \overrightarrow{Fot1}| \cdot |\overrightarrow{Fot0'} - \overrightarrow{Fot1'}|$$

When (Za1+Zb1)/2>(Za0+Zb0)/2, a blow angle is positive, so-called upper blow. Otherwise, the blow angle is negative, so-called under blow.

[Estimation of Angle of Approach]

Next, estimation of an angle of approach ζ immediately before and at impact will be described hereinafter. Here, an angle of approach ζ is an angle ζ formed by coordinates projected onto an XY plane of coordinates of a line segment connecting face centers at t=0 and t=1 and the X axis. The face center Foxy0 projected onto an XY plane at t=0 is represented by the following expression (34). The face center Foxy1 projected onto the XY plane at t=1 is represented by the following expression (35). Thus, the angle of approach is determined with the following expression (36):

$$Foxy0 = ((Xa0+Xb0)/2, (Ya0+Yb0)/2, 0) \quad (34)$$

$$Foxy1 = ((Xa1+Xb1)/2, (Ya1+Yb1)/2, 0) \quad (35)$$

$$\tan\zeta = ((Ya1+Yb1)/2 - (Ya0+Yb0)/2)/((Xa1+Xb1)/2 - (Xa0+Xb0)/2) \quad (36)$$

When (Ya1+Yb1)/2>(Ya0+Yb0)/2, an angle of approach is negative, so-called inside out. Otherwise, the angle of approach is positive, so-called outside in.

As described above, with the behavior measurement method of a club head using the above measurement system 21, behavior of a club head immediately before and at impact is measured, identified on coordinates, and estimated. Specifically, a positional relationship of the club head is quantified.

[Estimation of a Position which has not been Obtained]

As estimation of a position which has not been obtained is same as the description in the column [Estimation of a position which has not been obtained] earlier, a description is omitted here.

Although positional data of each mark on three-dimensional coordinates is used in [Estimation of a position which has not been obtained] described earlier, the estimation is not limited to such an approach. Positional data of each mark on the two-dimensional coordinates may be used. Specifically, a secondary rotating matrix obtained from data photographed by the first camera 3A located right above a club head may be used. When importance is given to reduction of calculation time, two-dimensional positional data may be used, while three-dimensional positional data may be used when importance is attached to precision.

A method for measuring behavior of a club head according to the present invention is useful for diagnosis of swings, development of golf clubs and the like.

The above description is simply one example, and various changes can be made as far as they do not deviate from the essence of the present invention.

What is claimed is:

1. A method for measuring behavior of a golf club head and a ball, including steps of:
    attaching at least three marks to a face surface of a head of a golf club;
    attaching at least one additional mark to a top part of a crown portion of the head;
    at least three club cameras simultaneously photographing the marks at two points in time before impact;
    obtaining multiple pieces of two-dimensional data of the marks from signals of images simultaneously photographed at the two points in time before the impact;
    identifying three-dimensional positions of the marks at the two points in time, from the two-dimensional data of the marks at the two points in time;
    identifying behavior of the face surface from the three-dimensional position of each mark at the two points in time;
    identifying time of a contact of the face surface with the ball by updating in a time series the behavior of the face surface and a positional relationship with the ball;
    estimating behavior of the head at the time of contact of the face surface with the ball;
    at least two ball cameras simultaneously photographing a hit ball at two points in time;
    obtaining multiple pieces of two-dimensional data on the ball from signals of images of the hit ball simultaneously photographed at the two points in time;
    identifying a three-dimensional position and posture of the ball at the two points in time from the two-dimensional data of the ball at the two points in time;
    estimating a behavior value of the ball from the three-dimensional position and posture of the ball at the two points in time;
    determining a rotating matrix by calculating a rotation angle of the at least one additional mark on the top part of the crown portion between the two points in time from each positional data of the at least one additional mark on the top part of the crown portion at the two points in time; and
    estimating a three-dimensional position of one mark of the three marks on the face surface at any one point in time of the two points in time by using the rotating matrix when the three-dimensional position of said one mark is not identified.

2. The method for measuring according to claim 1, wherein the golf club is a wood type golf club,
    the at least one additional mark on the top part of the crown portion of the club head is a band-like mark, and
    the method further includes steps of
    determining a rotating matrix by calculating a rotation angle of the band-like mark between the two points in time from positional data of the band-like mark at the two points in time, and estimating a three-dimensional position of one mark of the three marks on the face surface by using the rotating matrix when the three-dimensional position of said one mark at any one point in time of the two points in time is not identified.

3. The method for measuring according to claim 1, wherein the golf club is an iron type golf club,
    the at least one additional mark on the top part of the crown portion of the club head is two additional marks which are spaced each other, and
    the method further includes steps of
    determining a rotating matrix by calculating a rotation angle of an imaginary line connecting the two additional marks on the top part of the crown portion between the two points in time from positional data of the two additional marks at the two points in time, and estimating a three-dimensional position of one mark of the three marks on the face surface by using the rotating matrix when the three-dimensional position of said one mark at any one point in time of the two points in time is not identified.

4. The method for measuring according to claim 1 wherein a behavior value of the head is a head speed, a hit point, a face angle, or moving loft angle, and
    a behavior value of the ball is a ball speed, a deflection angle, an initial-launch angle, backspin, and sidespin.

5. A measurement system, comprising an upper club camera, a right club camera, and a left club camera that continuously photograph behavior of a head of a golf club, and an upper ball camera and a lateral ball camera that continuously photograph behavior of a golf ball, and a computer, wherein
    at least three marks are attached to a face surface of the head, and at least one additional mark is attached to a top part of a crown portion of the head,
    the upper club camera is arranged above a ball to be hit, and the right club camera and the left club camera are spaced and arranged ahead in right and left,
    the upper ball camera is arranged above a ball to be hit, and the lateral ball camera is positioned to either right or left side of a ball to be hit,
    the club cameras are synchronized and enabled to continuously photograph,
    the ball cameras are synchronized and enabled to continuously photograph,
    the computer identifies behavior of the head from image data of the continuously photographed images of marks on the face surface of the head, identifies time of a contact of a face surface with the ball by updating in a time series a positional relationship of the face surface of the head and the ball from the behavior of the head, and measures a behavior value of the head at the time of contact and a behavior value of the hit ball, and
    the computer further determines a rotating matrix by calculating a rotation angle of the at least one additional mark on the top part of the crown portion between two points in time of the club head which is moving from each positional data of the at least one additional mark on the top part of the crown portion at the two points in time, and estimates a three-dimensional position of one mark of the three marks on the face surface at any one point in time of the two points in time by using the rotating matrix when the three-dimensional position of said one mark is not identified.

6. The measurement system according to claim 5, wherein
an angle formed by an optical axis of the upper ball camera and an optical axis of the lateral ball camera is 80° or larger and 100° or smaller, each optical axis of the right camera and the left camera forms an angle to a horizontal line of 30° or larger and 60° or smaller on an XZ plane of three-dimensional orthogonal coordinates of XYZ, the optical axis of the left camera forms an angle to the X axis of 0° or larger and 35° or smaller on an XY plane, the optical axis of the right camera forms an angle to the X axis of −35° or larger and 0° or smaller on the XY plane, the optical axes of the right and left cameras form an angle of 20° or larger and 90° or smaller on the XY plane, and the optical axis of the upper camera forms an angle of 80° and larger and 100° or smaller to a vertical line passing through a center of the golf ball.

7. The measurement system according to claim 5, wherein
the at least one additional mark on the top part of the crown portion of the head is a band-like mark, and the computer calculates a rotation angle of the band-like mark on the top part of the crown portion between the two points in time, from each positional data of the band-like mark at the two points in time, and obtains a rotating matrix; and from positional data of three or more marks on the face surface at one point in time of the two points in time and positional data of a smaller number of marks on the face surface at the other point in time, estimates positional data of the mark at the other point in time which has not been obtained by using the rotating matrix.

8. The measurement system according to claim 5, wherein
the at least one additional mark on the top part of the crown portion of the head is two additional marks which are spaced each other, and the computer calculates a rotation angle of an imaginary line connecting the two additional marks on the top part of the crown portion between the two points in time, from each positional data of the imaginary line at the two points in time, and obtains a rotating matrix; and from positional data of three or more marks on the face surface at one point in time of the two points in time and positional data of a smaller number of marks on the face surface at the other point in time, estimates positional data of the mark at the other point in time which has not been obtained by using the rotating matrix.

9. A method for measuring behavior of a club head, including steps of:

attaching at least three marks to a face surface of the club head;

attaching at least one additional mark to a top part of a crown portion of the club head;

obtaining multiple pieces of two-dimensional data of the marks at at least two points in time of the club head which is moving, with multiple cameras;

identifying positions of the marks on three-dimensional coordinates from the multiple pieces of two-dimensional data;

identifying the face surface from positional data of three or more marks on the three-dimensional coordinates;

identifying time of a contact of the face surface with the golf ball, by updating in a time series a positional relationship of the face surface and the golf ball;

determining a rotating matrix by calculating a rotation angle of the at least one additional mark on the top part of the crown portion between the two points in time from each positional data of the at least one additional mark on the top part of the crown portion at the two points in time; and estimating a three-dimensional position of one mark of the three marks on the face surface at any one point in time of the two points in time by using the rotating matrix when the three-dimensional position of said one mark is not identified.

10. The method for measuring behavior of a club head according to claim 9, wherein
the method determines time of a contact when the face comes in contact with the golf ball, by assuming that positions of the at least three marks are in a state of linear uniform motion, and using a normal vector of a face composed by the three positions, the normal vector passing through a center of the golf ball.

11. The method for measuring behavior of a club head according to claim 9, wherein the method identifies the positional relationship of the face surface and the golf ball by setting an origin of the three-dimensional coordinates at a center position of the golf ball.

12. The method for measuring behavior of a club head according to claim 9, wherein the method sets two-dimensional coordinates of the face surface from positional data on the three-dimensional coordinates of the three or more marks of the face surface.

13. The method for measuring behavior of a club head according to claim 12, including steps of obtaining data on three-dimensional coordinates of a contact point at the time of the contact of the face surface with the golf ball, and converting the data on the three-dimensional coordinates of the contact point into the two-dimensional coordinates of the face surface.

14. The method for measuring behavior of a club head according to claim 9, wherein the method calculates a moving loft angle of the club head by using position vectors of the marks on the three-dimensional coordinates and a reference axis vector to be obtained from the position vectors.

15. The method for measuring behavior of a club head according to claim 9, wherein the method calculates a face angle of the club head by using the position vectors of the marks on the three-dimensional coordinates.

16. The method for measuring behavior of a club head according to claim 9, wherein the method calculates a blow angle of the club head by using the position vectors of the marks on the three-dimensional coordinates at the at least two points in time.

17. The method for measuring behavior of a club head according to claim 9, wherein the method calculates an angle of approach of the club head by using the position vectors of the marks on the three-dimensional coordinates at the at least two points in time.

18. The method for measuring behavior of a club head according to claim 9, wherein the at least one additional mark on the top part of the crown portion of the head is a band-like mark, and the method further comprises the steps of:

calculating a rotation angle of the band-like marks between the two points in time from each positional data of the band-like marks at the two points in time, and obtaining a rotating matrix; and from positional data of three or more marks on the face surface at one point in time of the two points in time and positional data of a smaller number of marks on the face surface at the other point in time, estimating positional data of the mark at the other point in time which has not been obtained by using the rotating matrix.

19. The method for measuring behavior of a club head according to claim 9,
wherein the at least one additional mark on the top part of the crown portion of the head is two additional marks which are spaced each other, and the method further comprises the steps of:
from each positional data of an imaginary line connecting the two additional marks on the top part of the crown portion at the two points in time, calculating a rotation angle of the imaginary line between the two points in time and obtaining a rotating matrix; and
from positional data of three or more marks on the face surface at one point in time of the two points in time and positional data of a smaller number of marks on the face surface at the other point in time, estimating positional data of the mark at the other point in time which has not been obtained by using the rotating matrix.

20. A system for measuring behavior of a club head, comprising at least three marks attached to a face surface of the head of the golf club, at least one additional mark attached to a top part of a crown portion of the head, right camera and left camera which continuously photograph behavior of the club head, and a computer, wherein
the right camera is placed on the right side ahead of a direction of a flying ball, and the left camera is placed on the left side ahead of a direction of a flying ball;
the cameras are synchronized and enabled to continuously photograph,
the computer identifies positions of the marks on the face surface on three dimensional coordinates from data of the continuously photographed images of marks on the face surface, identifies the face surface from this positional data, and identifies time of a contact of the face surface with the golf ball by updating a positional relationship of the face surface and the golf ball in a time series, and
the computer further determines a rotating matrix by calculating a rotation angle of the at least one additional mark on the top part of the crown portion between two points in time of the club head which is moving from each positional data of the at least one additional mark on the top part of the crown portion at the two points in time, and estimates a three-dimensional position of one mark of the three marks on the face surface at any one point in time of the two points in time by using the rotating matrix when the three-dimensional position of said one mark is not identified.

21. The system for measuring behavior of a club head according to claim 20, wherein
each optical axis of the right camera and the left camera forms an angle to a horizontal line of 30° of larger and 60° or smaller on an XZ plane of three-dimensional orthogonal coordinates of XYZ,
the optical axis of the left camera forms an angle to X axis of 0° of larger and 35° or smaller on an XY plane,
the optical axis of the right camera forms an angle to X axis of −35° or larger and 0° or smaller on the XY plane, and
the optical axes of the right and left cameras form an angle to each other of 20° or larger and 90° or smaller on the XY plane.

22. The system for measuring behavior of a club head according to claim 20, comprising an upper camera for continuously photographing behavior of a head of a golf club, wherein the upper camera is placed above a golf ball to be hit, and
an optical axis of the upper camera forms an angle of 80° or larger and 100° or smaller to a vertical line passing through a center of the golf ball.

23. The system for measuring behavior of a club head according to claim 20, wherein
a first mark of marks on the face surface is arranged on a toe side of a vertical imaginary line, a second mark is arranged on a heel side of the vertical imaginary line, and the vertical imaginary line is a straight line which passes through a midpoint of the face surface and extends upward and downward on the face surface,
with one of the first and second marks as a reference mark, a third mark is arranged above or below the reference mark, and
an imaginary line connecting the reference mark with the third mark and an imaginary line connecting the first mark with the second mark form an angle of 85° or larger and 95° or smaller.

24. The measurement system according to claim 20, wherein
the at least one additional mark on the top part of the crown portion of the head is a band-like mark, and
the computer
calculates a rotation angle of the band-like mark on the top part of the crown portion between the two points in time, from each positional data of the band-like mark at the two points in time, and obtains a rotating matrix; and
from positional data of three or more marks on the face surface at one point in time of the two points in time and positional data of a smaller number of marks on the face surface at the other point in time, estimates positional data of the mark at the other point in time which has not been obtained by using the rotating matrix.

25. The measurement system according to claim 20, wherein
the at least one additional mark on the top part of the crown portion of the head is two additional marks which are spaced each other, and
the computer
calculates a rotation angle of an imaginary line connecting the two additional marks on the top part of the crown portion between the two points in time, from each positional data of the imaginary line at the two points in time, and obtains a rotating matrix; and
from positional data of three or more marks on the face surface at one point in time of the two points in time and positional data of a smaller number of marks on the face surface at the other point in time, estimates positional data of the mark at the other point in time which has not been obtained by using the rotating matrix.

* * * * *